(12) United States Patent
Shigenaga et al.

(10) Patent No.: US 6,910,808 B2
(45) Date of Patent: Jun. 28, 2005

(54) OPTICAL CONNECTOR FERRULE FOR SUPPORTING AN OPTICAL FIBER TAPE CONDUCTOR, OPTICAL CONNECTOR, METHOD FOR ASSEMBLING AN OPTICAL CONNECTOR AND OPTICAL FIBER INSERTING JIG

(75) Inventors: Takashi Shigenaga, Tokyo (JP); Katsuki Suematsu, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 33 days.

(21) Appl. No.: 10/361,966

(22) Filed: Feb. 10, 2003

(65) Prior Publication Data

US 2003/0174971 A1 Sep. 18, 2003

(30) Foreign Application Priority Data

| Feb. 14, 2002 | (JP) | 2002-037034 |
| Feb. 26, 2002 | (JP) | 2002-050180 |
| Apr. 16, 2002 | (JP) | 2002-113805 |

(51) Int. Cl.$^7$ ............................................. G02B 6/38
(52) U.S. Cl. .......................... 385/71; 385/70; 385/60
(58) Field of Search ...................... 385/71, 60, 65, 385/72, 77, 78, 80, 58, 70

(56) References Cited

U.S. PATENT DOCUMENTS

| 5,815,621 | A | * | 9/1998 | Sakai et al. .................. 385/80 |
| 6,520,686 | B1 | * | 2/2003 | Kiani ........................... 385/54 |
| 6,629,781 | B2 | * | 10/2003 | Shigenaga et al. ............ 385/78 |
| 2003/0044123 | A1 | * | 3/2003 | Kiani et al. .................. 385/59 |

* cited by examiner

*Primary Examiner*—Chandrika Prasad
(74) *Attorney, Agent, or Firm*—Cantor Colburn LLP

(57) ABSTRACT

An optical connector ferrule for supporting an optical fiber tape conductor having an end of which a coating is peeled off to expose optical fibers, comprising: a plurality of fiber inserting holes which are arranged at a plurality of steps and into which the optical fibers are inserted; a guide portion for guiding insertion of optical fibers, formed so as to have an end communicating with a fiber inserting end of each of the fiber inserting holes, the guide portion extending along an axial direction of the fiber inserting holes; and a contact portion formed to be a predetermined distance spaced from an opening end opposed to the fiber inserting end of each of the fiber inserting holes along the axial direction of the fiber inserting holes, the contact portion being brought in contact with an exposed fiber side end of a tape member of the optical fiber tape conductor when each of the optical fibers of the optical fiber tape conductor is inserted into each of the fiber inserting holes.

24 Claims, 30 Drawing Sheets

OPTICAL CONNECTOR FERRULE FOR SUPPORTING AN OPTICAL FIBER TAPE CONDUCTOR, OPTICAL CONNECTOR, METHOD FOR ASSEMBLING AN OPTICAL CONNECTOR AND OPTICAL FIBER INSERTING JIG

FIELD OF THE INVENTION

The present invention relates to an optical connector ferrule, an optical connector, an optical connector assembling method and an inserting jig for inserting an optical fiber tape into the ferrule, which are used at a junction between optical fibers in opto-electronic communication or at a junction of an optical module of an optical semiconductors or the like.

RELATED ART

With a developing information network including an optical fiber network, transmission capacity is rapidly increasing. Accordingly, demands for high density are growing in an optical connector ferrule used in a junction between optical fibers or a junction of an optical module of an optical semiconductor or the like.

In order to realize the high density, a multi-core optical connector ferrule is being pursued so as to allow batch connection of a plurality of optical fibers while maintaining an appearance shape and size of a conventional ferrule.

Particularly, in these days, a one-step multi-core (1 step×n cores) ferrule which has one step of multi-core fiber insertion holes (pin holes) for supporting a plurality of optical fibers is being replaced with a multi-step multi-core (m steps×n cores) ferrule which has realized higher density.

FIG. 1-9 shows one example of an optical connector ferrule 50 which has multi-core (n filaments) fiber inserting holes provided at multi-step (m steps) (m steps×n cores connector ferrule). More specifically, the optical connector ferrule 50 shown in FIG. 1-9 is a 60-core ferrule having n-core (=12) fiber inserting holes 51 aligned along the horizontal direction in the figure provided at m-step (=5) along the vertical direction in the figure.

This optical connector ferrule 50 fixedly supports ends of exposed optical fibers (here, bare fibers) of multi-core optical fiber tape conductors 53 corresponding to the above-mentioned multi-core fiber inserting holes by the use of the multi-core fiber inserting holes so as to facilitate connection to an optical connector, an optical module or the like of a connecting counterpart.

The outer diameter of an optical fiber and the inner diameter of a fiber inserting hole of the ferrule are both extremely small. To improve workability of inserting each optical fiber to a corresponding fiber inserting hole, the ferrule includes a guide groove for guiding insertion of each optical fiber into the corresponding inserting hole.

FIG. 1-10 is a vertical sectional view of the ferrule 50 shown in FIG. 1-9, taken along the line in the step direction which passes through the centers of the vertically aligned fiber insertion holes 51. As shown in FIG. 1-10, a guide groove 52 at each step of the multi-core optical connector ferrule 50 have an end extending axially longer than that of a one-step higher guide groove 52.

In assembling an optical connector with use of such a multi-core optical connector ferrule 50, a plurality of (5) multi-core optical fiber tape conductors 53a1 to 53a5 corresponding in number to the steps are prepared. Then, a tape portion of a first-step multi-core optical fiber tape conductor 53a1 among the prepared multi-core optical fiber tape conductors 53a1 to 53a5 is peeled off so as to have exposed optical fibers (bare fibers) 54a1, which are inserted into undermost (first-step) fiber inserting holes 51a1.

Then, the optical fibers 54a1 are inserted into the fiber inserting holes 51a1 in such a manner that exposed fiber side ends (peeled tape ends) 53b1 in the multi-core optical fiber tape conductor 53a1 make contact with the guide grooves 52 of the fiber inserting holes 51a1 (refer to FIG. 1-11).

Next, optical fibers 54a2 to 54a5 of the respective multi-core optical fiber tape conductors 53a2 to 53a5 are inserted into the respective fiber inserting holes 51a2 to 51a5 of second and later steps (second to fifth steps) sequentially from the lower step.

At this time, the optical fibers 54a2 to 54a5 of the second to fifth steps are inserted into the respective fiber inserting holes 51a2 to 51a5 in such a manner that positions of exposed fiber side ends (tape peeled ends) 53b2 to 53b5 of the multi-core optical fiber tape conductors 53a2 to 53a5 along the axial direction of the fiber inserting holes are aligned with a position of the exposed fiber side end 53b1 of the first step along the axial direction of fiber inserting holes (refer to FIG. 1-11).

In this way, while the optical fibers 54a1 to 54a5 of the respective multi-core optical fiber tape conductors 53a1 to 53a5 are inserted in the respective fiber inserting holes 51a1 to 51a5, a fiber fixing member such as an adhesive agent is injected from a window 55 into the ferrule to fix the optical fibers 54a1 to 54a5, thereby assembling an optical connector.

For the case of an optical connector ferrule 50 with n-core fiber inserting holes arranged at multiple steps (m steps×n cores optical connector ferrule), a hole pitch between vertically adjacent fiber inserting holes of 51a1 to 51a5 (vertical pitch between the centers of vertically adjacent holes) is typically 0.25 mm ("vertical" or "vertically" here means "in the direction of steps"). On the other hand, the vertical thickness of each of the multi-core optical fiber tape conductors 53a1 to 53a5 is typically 0.3 mm.

Accordingly, between vertical positions of the axes of the fiber inserting holes 51a2 to 51a5 of second and later steps and vertical positions of the centers of the corresponding multi-core optical fiber tape conductors 53a2 to 53a5, there may occur a misalignment which corresponds to the difference between the vertical pitch between the fiber inserting holes and the thickness of the multi-core optical fiber tape conductors.

Here, the misalignment between the vertical position of the undermost-step (first-step) fiber inserting holes 51a1 and the vertical position of the corresponding multi-core optical fiber tape conductor 53a1 depends on the inner configuration of the ferrule. When this misalignment is α, a misalignment $G_k$ between the vertical position of the axis of the fiber inserting holes 51ak of $k^{th}$ step from the bottom step $\{1 \leq k \leq m\ (=5)\}$ and the vertically center position of the multi-core optical fiber tape conductor 53ak is given by the following equation (1-1) using a difference 0.05 mm between the vertical pitch of fiber inserting holes and the thickness of each multi-core optical fiber tape conductor.

$$G_k = 0.05(k-1) + \alpha \qquad \text{EQUATION 1-1}$$

Seen from the equation (1-1), the larger the step number k is, the larger the aforementioned misalignment $G_k$ becomes. Therefore, when the optical fibers 54a1 to 54a5 of the multi-core optical fiber tape conductors 53a1 to 53a5 are inserted into the respective fiber inserting holes 51a1 to 51a5 while the misalignment Gk is left between the vertical positions of the axes the fiber inserting holes in the second and later steps and the vertically center position of the respective multi-core optical fiber tape conductors of the respective steps, there occurs a bend particularly in each of the optical fibers 54a2 to 54a5 corresponding to the second and later steps, which is seen in FIG. 1-11. Accordingly, the optical fibers 54a2 to 54a5 in the corresponding second and later steps are fixed bending.

The bends of the optical fibers (bare fibers) might cause an increase in connection loss from the viewpoint of the optical characteristics. Further, from the viewpoint of intensity, if a bending portion becomes deformed due to shrinking and swelling in the ferrule caused by temperature change, moisture taking or the like, this might induce a break in bare fibers.

Such a multi-core optical connector ferrule is manufactured principally by molding with plastic resin in view of mass production, cost and the like. Besides, when an optical connector is assembled using the aforementioned multi-core optical connector ferrule, multi-core optical fiber tape conductors corresponding in number to the steps are prepared. Tape members of the prepared multi-core optical fiber tape conductors are peeled off to expose optical fibers (i.e. bare fibers) which are inserted into the respective fiber inserting holes, and a fiber fixing member such as an adhesive agent is injected from a window to the inside of the ferrule, to fix the optical fibers, thereby assembling an optical connector.

In order to further increase density of the above-described multi-step multi-core ferrule, it is necessary to lower a horizontal pitch between horizontally adjacent optical fibers and a vertical pitch between vertically adjacent optical fibers. In particular, demands for a smaller vertical pitch between vertically adjacent optical fibers than the thickness of the fiber tape conductor are growing so as to obtain high density.

For example, the thickness of a fiber tape is typically 0.3 mm and the pitch between vertically adjacent optical fibers is set at 0.25 mm. with this configuration, if a misalignment between the axis of the first-step fiber inserting holes 51a1 and the center of an exposed fiber (bare fiber) side end (peeled tape end) of an optical fiber tape conductor which is to be inserted into the first-step inserting holes is 0, there occurs, between the axis of the fiber inserting holes of each of second and later steps and the center of an exposed fiber side end of the corresponding optical fiber tape conductor, a vertical misalignment, which corresponds to a difference between the vertical pitch of the fiber inserting holes and the thickness of the fiber tape conductor.

Thus, when the bare fibers of the multi-core optical fiber tape conductors are inserted into the respective fiber inserting holes in the situation where a vertical misalignment is left between the axis of the fiber inserting holes of each of second and later steps and the center of the exposed fiber side end of the corresponding optical fiber tape conductor, there occurs a bend particularly in each of the optical fibers corresponding to 2 or more steps. In other words, bare fibers of the optical fiber tape conductors corresponding to the second or later steps are fixed while they are bending.

The bends of the bare fibers of the optical fiber tape conductors are found between fiber inserting ends of the fiber inserting holes and the bare fibers side ends of the optical fiber tape conductors. Particularly, when the steps are increased in number, occurrence of bends becomes more remarkable.

Conventionally, there has been used an optical connector called MT (Mechanical Transferable) connector in connecting of optical fibers. The MT connector is configured by inserting an optical fiber ribbon (hereinafter referred to as "optical fiber tape") B of plural fiber elements arranged in parallel into a ferrule C to fix the optical fiber tape therein, as shown in FIG. 3-7. Specifically, as shown in FIG. 3-8A, coating of an end of the optical fiber tape B is peeled off to expose optical fibers A of appropriate length, and a boot D is put around the coating portion next to the bare fibers A. Then, the optical fiber tape B is manually inserted into the ferrule C through a slot E of the ferrule C, and the optical fibers A are inserted along the bottom surface of optical fiber alignment grooves F ahead of the slot E.

Then, as shown in FIG. 3-8B, the optical fibers A are allowed to pass through optical fiber holes G communicating from the optical fiber grooves F so that tip ends of the optical fibers A are protruding form a contact side face H of the ferrule C. Then, the adhesive agent is injected through an adhesive agent injecting hole J of the ferrule C to fix the optical fiber tape B and the ferrule C. Later, the optical fibers A protruding form the contact side face H of the ferrule C are polished off so that the tip ends of the optical fibers A and the contact side face H of the ferrule C are substantially flush, as shown in FIGS. 3-8C and 3-8D.

At present, there has been developed various jigs for allowing the aforementioned optical fibers A to pass through the optical fiber holes G. An example is shown in FIGS. 3-9A and 3-9B. This jig is formed by providing a ferrule inserting portion P protruding from a side face N of a base member L which has a guide groove M for guiding a optical fiber tape B onto a upper surface K. The side face N of the base material L is provided with a guide pin Q in such a manner that the guide pin Q is protruding from the face N. This guide pin Q is inserted into a guide pin hole R (shown in FIG. 3-7) of the ferrule C to be set in the ferrule inserting portion P so as to position the ferrule C. The ferrule inserting portion P is axially supported by a fixing pin S so as to turn in the directions indicated by an arrow shown in FIG. 3-9A.

Inserting of the optical fibers A into the optical fiber inserting holes G of the ferrule C by means of jigs shown in FIGS. 3-9A and 3-9B is carried out in the following manner. First, the ferrule C is set at ferrule inserting portion P as shown in FIG. 3-9B. Then, also shown in FIG. 3-9B, optical fiber tape B is set in the guide groove M and slid to the ferrule inserting portion P side along the guide groove M so as to insert the optical fibers A from the slot E into the ferrule C. More specifically, the optical fibers A are inserted in the vicinity of the optical fiber alignment grooves F. Then, the ferrule inserting portion P is turned as shown in FIG. 3-10 to put the optical fibers onto the optical fiber alignment grooves F. Once the optical fiber A is put on the optical fiber groove F, the optical fiber tape is inserted further into the ferrule C along the guide groove M to as to allow the optical fibers A pass through the optical fiber G ahead of the optical fiber groove F.

The jigs shown in FIGS. 3-9A and 3-9B have problems mentioned below:

(1) When coating of an optical fiber tape B is removed to expose optical fibers A, the exposed optical fibers A are widened as shown in FIG. 3-11 and it is sometimes difficult to keep the optical fibers aligned. If the optical fibers A are not aligned, they are not allowed to be placed in fiber alignment grooves F of a ferrule C shown in FIG. 3-7 and the like, which makes it difficult to insert the optical fibers A into fiber inserting holes G.

(2) In the case of a multi-core ferrule which has fiber inserting holes formed at plural steps, optical fibers are sequentially inserted into the undermost-step fiber inserting holes to the uppermost-step fiber inserting holes. For this reason, when optical fibers are inserted into fiber inserting holes of the second or later step, a previously inserted optical fiber tape is left in guide groove M shown in FIG. 3-9B, and another optical fiber tape has to be superposed on the previous one. However, conventionally, there was only a jig for multi-core ferrule which has fiber inserting holes formed at a step. As shown in FIG. 3-12, the jig has a guide groove M of depth smaller than the thickness of the optical fiber tape B, and when two or more optical fiber tapes B are superposed, the second and later optical fiber tapes can not be positioned. In addition, as shown in FIGS. 3-13A and 3-13B, distortion or deformation of coating per se of the optical fiber tape B sometimes makes it difficult to superpose another optical fiber tape B on the previously inserted optical fiber tape B. In any event, a previously inserted optical fiber tape prevents inserting operation of a next optical fiber tape, which makes working efficiency significantly worse.

(3) According to a jig as shown in FIGS. 3-9A and 3-9B, a ferrule C is positioned by inserting guide pins Q provided protruding from a side face N of a base member L into guide pin holes R of the ferrule C. Therefore, in order to remove the ferrule C from a ferrule inserting portion P after inserting operation, the ferrule has to be moved in the axial direction of the guide pins to be removed from the guide pins. However, since the axial direction of the guide pins is in parallel with the inserting direction of the optical fibers, the ferrule which is moved in the axial direction of the guide pins might have the inserted optical fibers detached from the ferrule.

The present invention was carried out in view of the foregoing. An object of the present invention is to provide an optical connector ferrule, an optical connector and an optical connector assembling method which enable bends of optical fibers (base fibers) to be reduced so as not to influence on the optical characteristics and intensity of the optical fibers, thereby preventing deterioration of the optical characteristics and intensity of the whole ferrule and the whole optical connector due to the aforementioned bends of the optical fibers.

SUMMARY OF THE INVENTION

An embodiment of an optical connector ferrule of the present invention is an optical connector ferrule for supporting an optical fiber tape conductor having an end of which a coating is peeled off to expose optical fibers, comprising:

a plurality of fiber inserting holes which are arranged at a plurality of steps and into which said optical fibers are inserted;

a guide groove for guiding insertion of optical fibers, formed so as to have an end communicating with a fiber inserting end of each of said fiber inserting holes, said guide groove extending along an axial direction of said fiber inserting holes; and a contact portion formed to be a predetermined distance spaced from an opening end opposed to the fiber inserting end of each of said fiber inserting holes along the axial direction of said fiber inserting holes, said contact portion being brought in contact with an exposed fiber side end of a tape member of said optical fiber tape conductor when each of said optical fibers of said optical fiber tape conductor is inserted into each of said fiber inserting holes.

Another embodiment of the optical connector ferrule of the present invention is an optical connector ferrule in which a predetermined distance from the opening end of each of said fiber inserting holes to said contact portion along the axial direction of said fiber inserting holes is determined in such a manner that when each of said optical fibers of said optical fiber tape conductor is inserted into a corresponding one of said fiber inserting holes at the respective steps, each curvature radius of r1 to rm (where m is an integer of at least 2, corresponding to the number of the steps) of bends of the optical fibers at the respective steps becomes at least a predetermined value.

Yet another embodiment of the optical connector ferrule of the present invention is an optical connector ferrule comprising:

a plurality of fiber inserting holes which are arranged at a plurality of steps and into which optical fibers are inserted; and a guide portion for guiding insertion of optical fibers, formed so as to communicate with a fiber inserting end of each of said fiber inserting holes, said guide portion extending along an axial direction of said fiber inserting holes, in which a length of said guide portion along the axial direction of said fiber inserting holes is set in a range of 0.3 mm to 0.7 mm.

Still another embodiment of the optical connector ferrule of the present invention is an optical connector ferrule comprising a first side face having an opening face which includes opening ends of said plurality of fiber inserting holes; and a second side face provided communicating with a vertical edge of said first side face along and extending along the axial direction of said fiber inserting holes, said second side face having a window through which is injected a fiber fixing member for fixing the optical fibers inserted into said fiber inserting holes, respectively, in which a length from said first side face to a window formed portion in said second side face along a direction of inserting said optical fibers is set at 2.0 mm or longer.

Still yet another embodiment of the optical connector ferrule of the present invention is an optical connector ferrule in which said optical fibers are optical fibers corresponding in number to said fiber inserting holes, being exposed by peeling off a tape member of an end of an optical fiber tape conductor coated with a tape member, said optical connector ferrule comprising a slot, formed opposed to said first side face, for inserting a plurality of optical fiber tape conductors corresponding to said fiber inserting holes at the respective steps, and a position of said slot is determined in such a manner that when the optical fibers of each of said optical fiber tape conductors are inserted individually into the fiber inserting holes at a desired step of the plurality of steps via said slot, a vertical misalignment between a central axis of each of said fiber inserting holes and a center of an exposed fiber side end of a corresponding one of said optical fiber tape conductors becomes 0.

Another embodiment of the optical connector ferrule of the present invention is an optical connector ferrule for supporting an optical fiber tape conductor provided with a plurality of optical fibers coated with a tape member, said optical fiber tape conductor having an end of which a coating is peeled off to expose optical fibers, comprising:

a plurality of fiber inserting holes which are arranged at a plurality of steps and into which said optical fibers are inserted;

a guide portion for guiding insertion of optical fibers, formed so as to communicate with a fiber inserting end of each of said fiber inserting holes, said guide portion extending along an axial direction of said fiber inserting holes, in which a vertical misalignment between a central axis of said fiber inserting holes at each step into which when the optical fibers of said optical fiber tape conductor are inserted and a center of an exposed fiber side end in the tape member of said optical fiber tape conductor is indicated by $G1$ to $Gn$ (where n is an integer of at least 2, corresponding to the number of the steps), and a distance between a connecting end of the guide portion corresponding to said each of fiber inserting holes and the exposed fiber side end in the tape member of the optical fiber tape conductor is indicated by $D1$ to $Dn$, the misalignment of $G1$ to $Gn$ and the distance of $D1$ to $Dn$ are used to express each curvature radius of $r1$ to $rn$ of bends of the optical fiber tape conductors of the respective steps, and a length of said guide portion along the axial direction of said fiber inserting holes is determined such that the curvature radius of $r1$ to $rn$ becomes at least a predetermined value.

Yet another embodiment of the optical connector ferrule of the present invention is an optical connector ferrule in which in addition to a requirement of the curvature radii $r1$ to $rn$ of the bends, the length of said guide portion along the axial direction of said fiber inserting holes is determined in such a manner that a misalignment of either step in misalignments of $G1$ to $Gn$ is set at 0.

Still another embodiment of the optical connector ferrule of the present invention is an optical connector ferrule having a first side face having an opening face which includes opening ends of said plurality of fiber inserting holes; and a second side face provided communicating with a vertical edge of said first side face and extending along the axial direction of said fiber inserting holes, said second side face having a window through which is injected a fiber fixing member for fixing the optical fibers inserted in said fiber inserting holes, in which the length of said guide portion along the axial direction of said fiber inserting holes is determined in such a manner that the curvature radius of $r1$ to $rn$ of the bends is set at 30 mm or longer, a length from said first side face to a window formed portion in said second side face along a direction of inserting said optical fibers is set at 2.0 mm or longer.

An embodiment of an optical connector of the present invention is an optical connector comprising: an optical fiber tape conductor having an end of which a coating is peeled off to expose optical fibers; and a ferrule for supporting said optical fiber tape conductor, said ferrule comprising:

a plurality of fiber inserting holes which are arranged at a plurality of steps and into which said optical fibers are inserted;

a guide portion for guiding insertion of optical fibers, formed so as to have an end communicating with a fiber inserting end of each of said fiber inserting holes, said guide portion extending along an axial direction of said fiber inserting holes; and a contact portion formed to be a predetermined distance spaced from an opening end opposed to the fiber inserting end of each of said fiber inserting holes along the axial direction of said fiber inserting holes, said contact portion being brought in contact with an exposed fiber side end of a tape member of said optical fiber tape conductor when each of said optical fibers of said optical fiber tape conductor is inserted into a corresponding one of said fiber inserting holes.

Another embodiment of an optical connector of the present invention is an optical connector comprising: a ferrule; and an optical fiber tape conductor provided with a plurality of optical fibers coated with a tape member, said optical fiber tape conductor having an end of which a coating is peeled off to expose optical fibers, said ferrule comprising:

a plurality of fiber inserting holes which are arranged at a plurality of steps and into which said optical fibers are inserted;

a guide portion for guiding insertion of optical fibers, formed so as to communicate with a fiber inserting end of each of said fiber inserting holes, said guide portion extending along an axial direction of said fiber inserting holes;

a first side face having an opening face which includes opening ends of said plurality of fiber inserting holes;

a second side face provided communicating with a vertical edge of said first side face and extending along the axial direction of said fiber inserting holes, said second side face having a window through which is injected a fiber fixing member for fixing the optical fibers inserted in said fiber inserting holes; and a slot provided at a side face opposed to said first side face, and said optical fiber tape conductor of which the optical fibers and a tape member are inserted into said ferrule through said slot, each of the optical fibers being supported by being inserted into a corresponding one of said fiber inserting holes via said guide portion, a length of said guide portion along the axial direction of said fiber inserting holes being set in a range of 0.3 mm to 0.7 mm, a length from said first side face to a window formed portion in said second side face along a direction of inserting said optical fibers is set at 2.0 mm or longer, and a distance between an exposed fiber side end face of the tape member of said optical fiber tape conductor inserted in said ferrule and an opening end face of said slot is set at 0.5 mm or longer.

An embodiment of an optical connector assembling method of the present invention is an optical connector assembling method for assembling an optical connector with the use of an optical fiber tape conductor having an end of which a coating is peeled off to expose optical fibers, comprising the steps of:

preparing a ferrule which has: a plurality of fiber inserting holes which are arranged at a plurality of steps and into which said optical fibers are inserted; a guide portion for guiding insertion of optical fibers, formed so as to have an end communicating with a fiber inserting end of each of said fiber inserting holes, said guide portion extending along an axial direction of said fiber inserting holes; and a contact portion formed to be a predetermined distance spaced from an opening end opposed to the fiber inserting end of each of said fiber inserting holes along the axial direction of said fiber inserting holes; and inserting each of said optical fibers of said optical fiber tape conductor inserted into a corresponding one of said fiber inserting holes so that an exposed fiber side end of a tape member of said optical fiber tape conductor is brought in contact with said contact portion.

An embodiment of an optical fiber inserting jig of the present invention is an optical fiber inserting jig comprising a ferrule set stage for setting a ferrule and a fiber set stage for setting an optical fiber tape conductor, said optical fiber tape conductor, which has an edge of which a coating is peeled off to expose optical fibers, being set on said fiber set stage and slid toward said ferrule set stage, thereby allowing the optical fibers to be inserted into fiber inserting holes of the ferrule set on said ferrule set stage, wherein a fiber alignment portion for aligning the optical fibers is provided on said ferrule set stage, said fiber set stage or between said ferrule set stage and said fiber set stage, said fiber alignment portion having more than two fiber inserting grooves divided by a plurality of dividing plates and allowing the optical fibers to be aligned by inserting the optical fiber into the respective fiber inserting grooves.

Another embodiment of the optical fiber inserting jig of the present invention is an optical fiber inserting jig in which said fiber set stage is slidable along a direction perpendicular to an axial direction of the optical fiber tape conductor set on said fiber set stage, an optical fiber tape conductor is allowed to be set on said fiber set stage once a previously-inserted optical fiber tape conductor is taken away under said fiber set stage.

BRIEF DESCRIPTION OF THE DRAWINGS

FIG. 1-2 is a vertical sectional view of the ferrule shown in FIG. 1-1 taken along the line passing through the centers of vertically aligned fiber inserting holes or the line II—II in FIG. 1-3.

FIG. 1-3 is a cross sectional view of the ferrule shown in FIG. 1-2 taken along upper edges of the guide grooves corresponding to the third-step fiber inserting holes or the line III—III.

FIG. 1-4 is a vertical sectional view, corresponding to FIG. 1-2, of the ferrule and optical fiber tape conductors in which optical fibers of the optical fiber tape conductors are inserted into the first to fifth-step fiber inserting holes of the ferrule, view being taken along the line passing through the centers of the vertically aligned fiber inserting holes;

FIG. 1-5 is a cross sectional view of the ferrule into which optical fibers of the optical fiber tape conductors are inserted shown in FIG. 1-4, view being taken along upper edges of the guide grooves corresponding to the third-step fiber inserting holes and seen from the line V—V;

FIG. 1-6 is an enlarged view of bends in optical fibers of multi-core optical fiber tape conductors, which are inserted into the conventional first to third-step fiber inserting holes;

FIG. 1-7 is a view showing a trace of an optical fiber of which both side are misaligned;

FIG. 1-8 is an enlarged view of bends in optical fibers of multi-core optical fiber tape conductors, which are inserted into the first to third-step fiber inserting holes according to an embodiment of the present invention;

FIG. 1-9 is a perspective view schematically illustrating a configuration of a conventional optical connector ferrule;

FIG. 1-10 is a vertical sectional view of the ferrule in FIG. 1-9, taken along the line passing through the centers of vertically aligned fiber inserting holes;

FIG. 1-11 is a vertical sectional view of the ferrule in FIG. 1-10 into which optical fibers of optical fiber tape conductors are inserted;

FIG. 2-1 is a schematic perspective view illustrating a configuration of an optical connector ferrule for assembling an optical connector according to an embodiment of the present invention and a configuration of a plurality of optical fiber tapes which are inserted into the ferrule to be fixedly supported.;

FIG. 2-2 is a vertical sectional view of the ferrule 1 shown in FIG. 2-1 taken along the line passing through the centers of vertically aligned fiber inserting holes or the line II—II;

FIG. 2-3 is a vertical sectional view of the ferrule and optical fiber tape conductors in which optical fibers of the optical fiber tape conductors are inserted into the first to fifth-step fiber inserting holes shown in FIG. 2-1, view being taken along the line passing through the centers of vertically aligned fiber inserting holes and taken along the line II—II;

FIG. 2-4 is a vertical sectional view showing a curvature radius of bends in the optical fibers inserted into the fifth-step fiber inserting holes;

FIG. 2-5 is a vertical sectional view, corresponding to FIG. 2-3, of a ferrule and a fiber tape, in which a second-step misalignment is 0;

FIG. 2-6 is a vertical sectional view, corresponding to FIG. 2-3, of a ferrule and a fiber tape, in which a third-step misalignment is 0;

FIG. 2-7A is a view showing a slot of the ferrule shown in FIG. 2-3;

FIG. 2-7B is a view showing a slot of the ferrule shown in FIG. 2-5;

FIG. 2-8 is a vertical sectional view, corresponding to FIG. 2-3, of a ferrule and a fiber tape, in which a second-step misalignment is 0 and the lengths of guide grooves are set at 0.3 mm;

FIG. 2-9 is a vertical sectional view of a ferrule and a fiber tape, corresponding to FIG. 2-3, according to a modification of the present embodiment;

FIG. 3-1 is a perspective view showing an example of a optical fiber inserting jig according to an embodiment of the present invention;

FIG. 3-2 is an enlarged view of a fiber alignment portion shown in FIG. 3-1;

FIG. 3-3 is an enlarged view of dividing plates of the fiber alignment portion;

FIG. 3-4 is a side view showing a space left between the ferrule and the fiber alignment portion;

FIG. 3-5A is a view for explaining operation of a fiber set stage;

FIG. 3-5B is a view for explaining operations of a fiber set stage;

FIG. 3-5C is a view for explaining operations of a fiber set stage;

FIG. 3-6A is an explanatory view showing an optical fiber inserting jig according to another embodiment of the present invention;

FIG. 3-6B is an explanatory view showing an optical fiber inserting jig according to another embodiment of the present invention;

FIG. 3-7 is a perspective view illustrating a ferrule and an optical fiber tape;

FIG. 3-8A is a view of steps of assembling an optical connector by inserting an optical fiber tape into the ferrule shown in FIG. 3-7;

FIG. 3-8B is a view of steps of assembling an optical connector by inserting an optical fiber tape into the ferrule shown in FIG. 3-7;

FIG. 3-8C is a view of steps of assembling an optical connector by inserting an optical fiber tape into the ferrule shown in FIG. 3-7;

FIG. 3-8D is a view of steps of assembling an optical connector by inserting an optical fiber tape into the ferrule shown in FIG. 3-7;

FIG. 3-9A is a side view showing an example of the conventional optical fiber inserting jig;

FIG. 3-9B is a plane view showing an example of the conventional optical fiber inserting jig;

FIG. 3-10 is an enlarged view of a ferrule inserting portion shown in FIG. 3-9;

FIG. 3-11 is an explanatory view showing widened optical fibers;

FIG. 3-12 is an explanatory view showing two optical fiber tapes superposed in the guide groove shown in FIG. 3-9;

FIG. 3-13A is an explanatory view of two optical fiber tapes which are prevented from being superposed well due to distortion of the optical fiber tape; and FIG. 3-13B is an explanatory view showing two optical fiber tapes which are prevented from being superposed well due to deformation of the optical fiber tape.

DETAILED DESCRIPTION OF THE INVENTION

Embodiments of the present invention will now be described with reference to the drawings.

Figure 1:
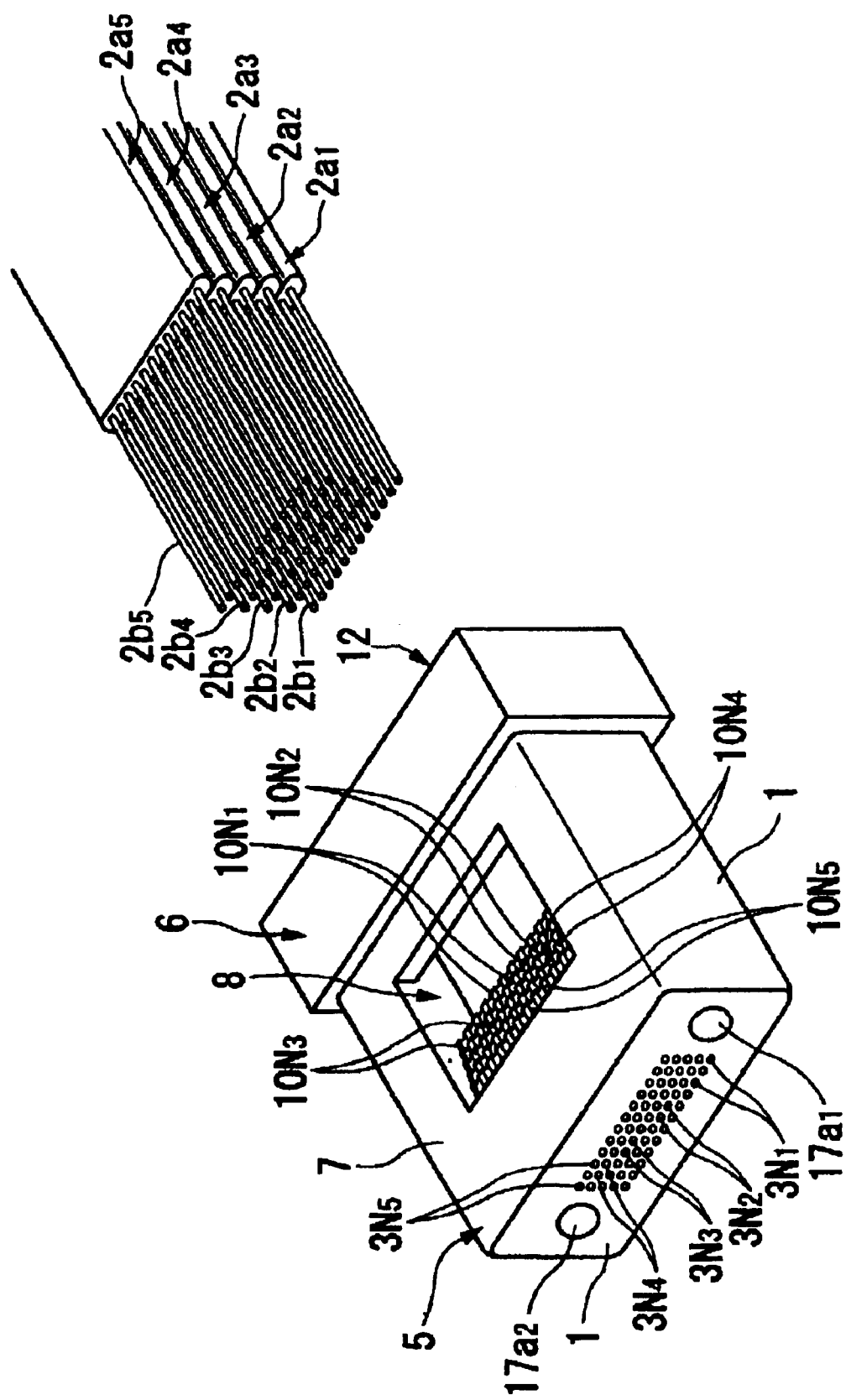
FIG. 1-1 is a schematic perspective view illustrating a configuration of an optical connector ferrule for assembling an optical connector according to an embodiment of the present invention and a configuration of a plurality of optical fiber tape conductors which are inserted into the ferrule to be fixedly supported.

FIG. 1-1 is a schematic perspective view illustrating a configuration of an optical connector ferrule (hereinafter referred to simply as a "ferrule") 1 for assembling an optical connector according to an embodiment of the present invention and a configuration of a plurality of optical fiber tape conductors (five optical fiber tape conductors $2a1$ to $2a5$ in this embodiment) which are inserted into the ferrule to be fixedly supported. The ferrule of the present invention is made of thermal plastic resin (for example, PPS (polyphenylene sulfide) resin) or thermosetting resin (for example, epoxy resin).

Figures 1, 2:
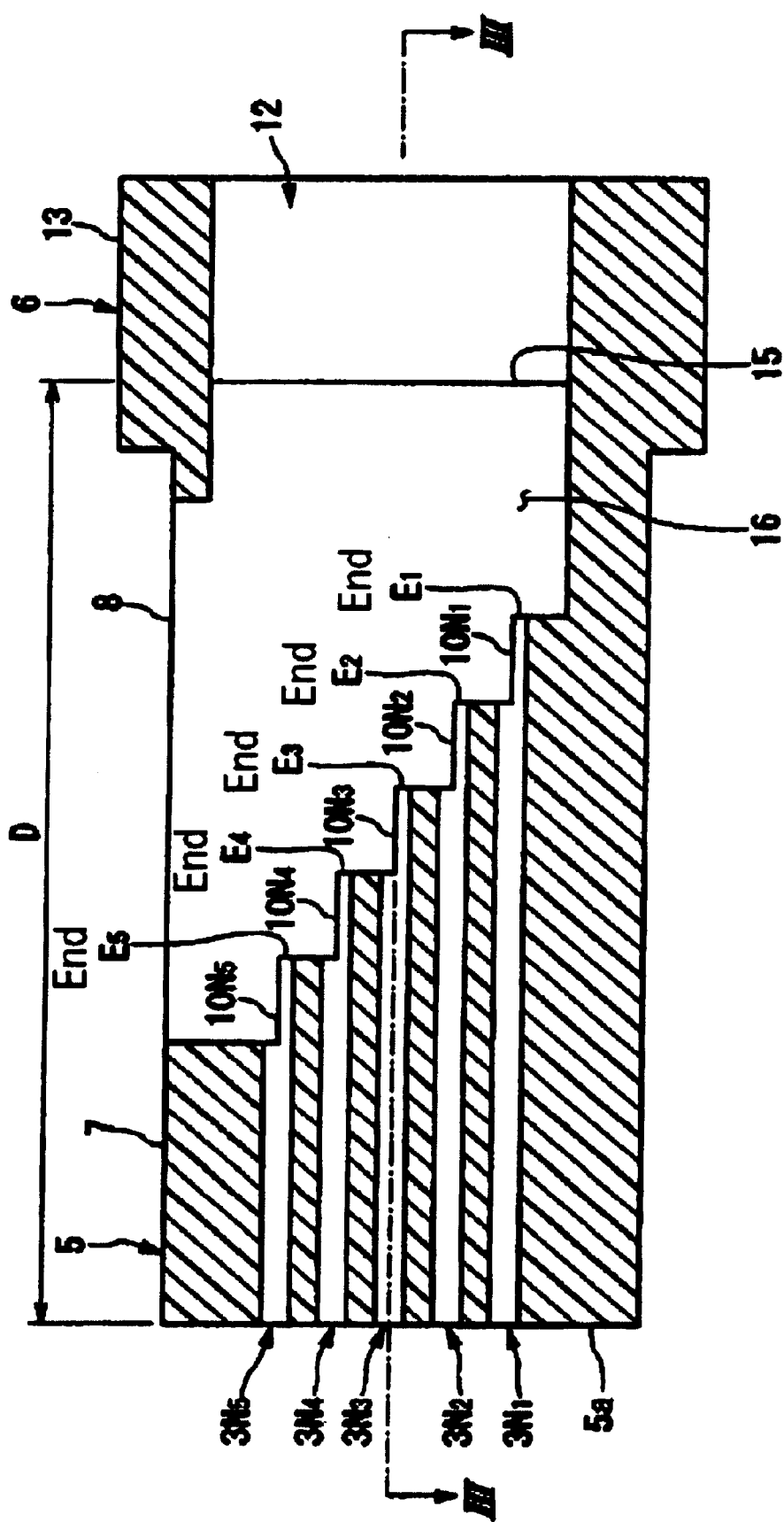

Further, FIG. 1-2 is a vertical sectional view of the ferrule 1 shown in FIG. 1-1 taken along the line passing through the centers of vertically aligned fiber inserting holes 3 or the line II—II in the following FIG. 1-3.

As shown in FIGS. 1-1 and 1-2, the ferrule 1 has the shape of a square and is integrally formed by molding with a material of plastic resin, for example.

More specifically, the ferrule 1 has a plurality of fiber inserting holes 3 ("a plurality of": "12 cores" in the present embodiment) along the longitudinal direction of the ferrule 1. The plurality of fiber inserting holes 3 are arranged at plural steps along the vertical direction of the ferrule (plural: first to fifth steps in the present embodiment). Besides, the plurality of fiber inserting holes 3 at each step are spaced with a predetermined pitch along the horizontal direction of the ferrule 1. The fiber inserting holes 3 are vertically spaced with a predetermined pitch.

Now in the present embodiment, 12-core fiber inserting holes 3 at the first step are indicated by 3N1, and likewise, 12-core fiber inserting holes 3 in the second to fifth steps are indicated by 3N2 to 3N5, respectively.

Optical fiber tape conductors $2a1$ to $2a5$ have, as shown in FIG. 1-1, a plurality of (12-core) optical fibers corresponding to the plurality of (12-core) fiber inserting holes 3 at the respective steps and tape members $2c1$ to $2c5$ for covering the plurality of optical fibers.

The optical fiber tape conductor $2a1$ corresponding to the first step has an end of which a coating is peeled off to expose 12-core optical fibers (bare fibers) $2b1$. Likewise, the fiber tape conductors $2a2$ to $2a5$ corresponding to the second to fifth steps have ends where 12-core optical fibers $2b2$ to $2b5$ are exposed.

A diameter of each of the fiber inserting holes 3N1 to 3N5 is approximately the same as the diameter of each of the optical fibers $2b1$ to $2b5$ so as to enable the optical fibers $2b1$ to $2b5$ to be inserted into the respective fiber inserting holes.

Further, the ferrule 1 includes a first housing 5 having an opening face with opening ends of the plurality of fiber inserting holes 3 arranged at the plural steps, said opening face being a contact side face $5a$ to another optical device such as an optical connector, an optical module or the like. Further, the ferrule 1 includes a second housing 6 which extending from the first housing 5 along the axial direction of the fiber inserting holes.

The first housing 5 includes a upper surface 7 which extends from an upper edge of the contact side face $5a$ to the second housing 6 along the axial direction of the fiber inserting holes, and this upper surface 7 has a window 8 formed for injecting an optical fiber fixing member (for example, adhesive agent) after inserting optical fibers of the optical fiber tape conductors 2 into the fiber inserting holes 3 at the respective steps.

And, the ferrule 1 includes guide grooves 10N1 to 10N5 for guiding insertion of the optical fibers, which are formed with the ends in contact with lower edges of the fiber inserting holes 3N1 to 3N5 of the respective steps and extend coaxially along the axial direction of the fiber inserting holes.

The first to fifth-step fiber inserting holes 3N1 to 3N5 extend up to the optical fiber inserting side of guide grooves of one-step upper fiber inserting holes, and the first to fifth guide grooves 10N1 to 10N5 and the fiber inserting holes 3N1 to 3N5 as a whole are stepped to become longer in a lower step than in a upper step, as seen from the section view in FIG. 1-2. Accordingly, the optical fiber inserting side end faces of the fiber inserting holes 3N1 to 3N5 at the respective steps are positioned farther from the contact side face $5a$ in a lower step than in a upper step.

Figures 1, 2, 3:
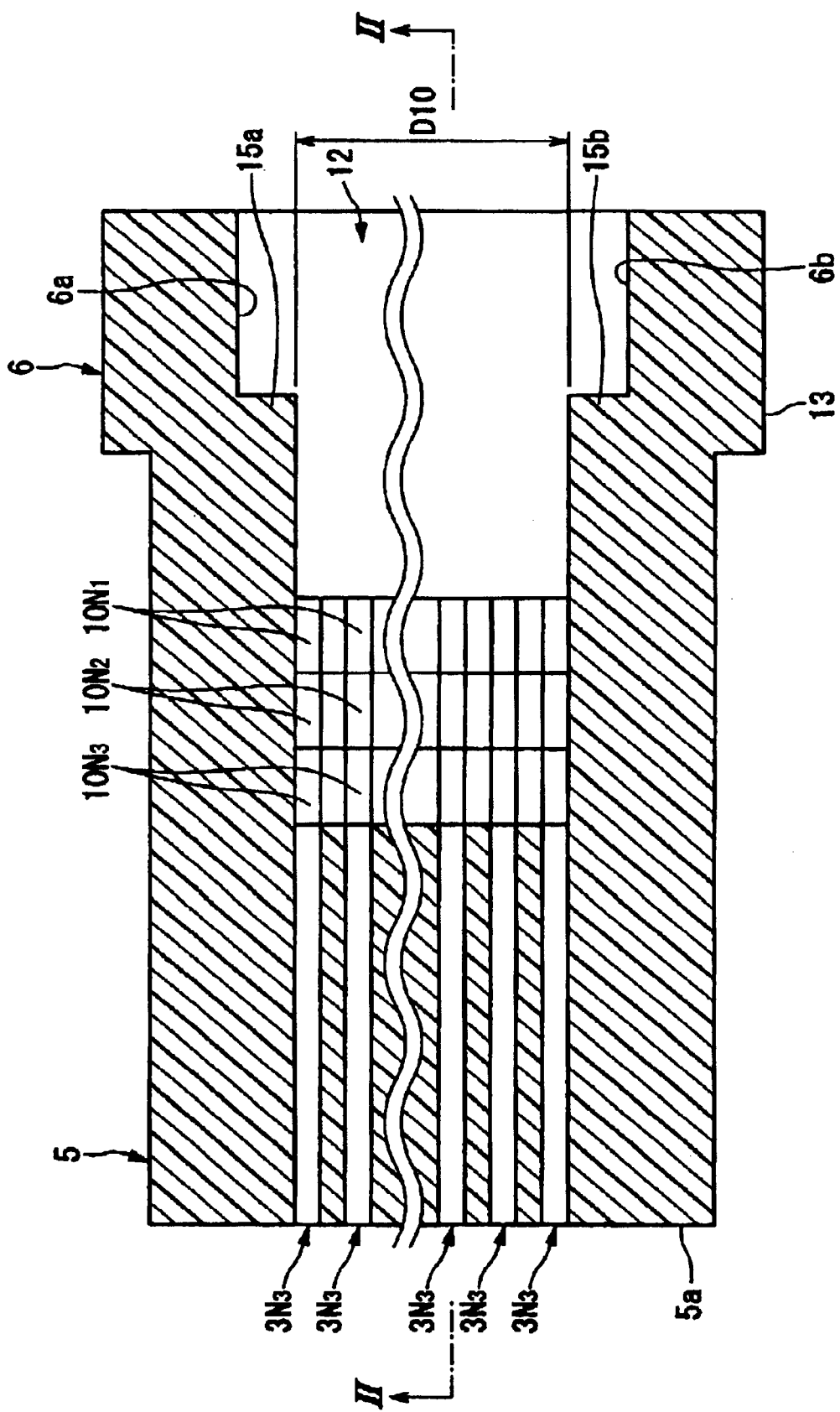

FIG. 1-3 is a cross sectional view of the ferrule 1 shown in FIG. 1-2 taken along upper edges of the guide grooves 10N3 corresponding to the third-step fiber inserting holes 3N3 and seen from the line III—III in FIG. 1-2.

As shown in FIGS. 1-2 and 1-3, the second housing 6 includes a slot 12, provided at a face opposed to the contact side face $5a$ of the first housing 5, for inserting the optical fiber tape conductors 2 and a flange 13 formed around the slot 12 formed portion.

The second housing 6 has a contact portion 15 formed a predetermined distance D away from the contact side face $5a$ along the axial direction of the fiber inserting holes, as shown in FIGS. 1-2 and 1-3.

As shown in FIG. 1-3, the contact portion 15 is formed as protrusive portions $15a$ and $15b$ stepped up inwardly from faced slot inner edges $6a$ and $6b$ in the second housing 6, respectively.

The distance D10 between the protrusive portions $15a$ and $15b$ is set shorter than the horizontal width W10 of each of exposed fiber side ends $2d1$ to $2d5$ in the tape members $2c1$ to $2c5$ of the optical fiber tape conductors $2a1$ to $2a5$.

The distance D10 between the protrusive portions $15a$ and $15b$ is set longer than the horizontal width W11 between the optical fibers $2b1$ and $2b5$ of the optical fiber tape conductors $2a1$ to $2a5$ (hereinafter referred to as "optical fiber width") so as not to prevent insertion of the optical fibers 2b1 to 2b5 of the optical fiber tape conductors 2a1 to 2a5.

The contact portion 15 is formed at a position in contact with the exposed fiber side ends (end faces) 2d1 to 2d5 in the tape members 2c1 to 2c5 of the optical fiber tape conductors 2a1 to 2a5 when the optical fibers 2b1 to 2b5 of the optical fiber tape conductors 2a1 to 2a5 are inserted into the fiber inserting holes 3N1 to 3N5 of the respective step.

Further, the ferrule 1 includes a receiving portion 16 formed between the fiber inserting holes 3N1 to 3N5 including the stepped guide grooves 10N1 to 10N5 and the slot 8, for receiving the optical fibers 2ba to 2b5 inserted into the fiber inserting holes 3N1 to 3N5.

Furthermore, the ferrule 1 has two guide pin holes 17a1 and 17a2, arranged at both sides of and in parallel with the fiber inserting holes 3, for inserting positioning guide pins.

In thus formed ferrule 1, the fiber tape conductor 2a1 corresponding to the first step is inserted into the receiving portion 16 through the slot 12.

The optical fibers 2b1 of the optical fiber tape conductor 2a1 are inserted into the corresponding first-step fiber inserting holes 3N1 along the guide grooves 10N1.

Then, the optical fibers 2b1 of the optical fiber tape conductor 2a1 are inserted into the corresponding fiber inserting holes 3N1 and supported by the fiber inserting holes 3N1 in such a way that where the exposed fiber side end 2d1 of the tape member 2c1 is in contact with the contact portion 15.

In inserting of the optical fibers 2b1 into the fiber inserting holes 3N1, since the distance D10 between the protrusive portions 15a and 15b of the contact portion 15 is shorter than the horizontal width W10 of each of the exposed fiber side ends (end faces) 2d1 to 2d5, the exposed fiber side ends 2d1 in the tape member 2c1 of the optical fiber tape conductor 2a1 is fixed in contact with the contact portion 15.

Then, the second to fifth-step optical fiber tape conductors 2a2 to 2a5 are inserted into the receiving portion 16 in ascending order from the second step, and the optical fibers 2b2 to 2b5 of the optical fiber tape conductors 2a2 to 2a5 are inserted into the fiber inserting holes 3N2 to 3N5 of the corresponding second to fifth steps along the guide grooves 10N2 to 10N5.

As is the case with the first step, the optical fibers 2b2 to 2b5 of the optical fiber tape conductors 2a2 to 2a5 are inserted into the corresponding fiber inserting holes 3N2 to 3N5 in such a way the exposed fiber side ends 2d2 to 2d5 of the tape members 2c2 to 2c5 are in contact with the contact portion 15, and the optical fibers are supported by the fiber inserting holes 3N2 to 3N5. Then, the exposed fiber side ends 2d2 to 2d5 of the tape members 2c2 to 2c5 of the optical fiber tape conductors 2a2 to 2a5 are fixed in contact with the contact portion 15.

FIG. 1-4 is a vertical sectional view of the ferrule 1 and optical fiber tape conductors 2a1 to 2a5 in which first to fifth-step optical fibers 2b1 to 2b5 of the optical fiber tapes conductors 2a1 to 2a5 are inserted into the first to fifth-step fiber inserting holes 3N1 to 3N5 of the ferrule 1, which view being taken along the line passing through the centers of vertically aligned fiber inserting holes 3N1 to 3N5, corresponding to FIG. 1-2.

FIG. 1-5 is a cross sectional view of the ferrule into which optical fibers 2b1 to 2b5 of the optical fiber tape conductors 2a1 to 2a5 are inserted, as shown in FIG. 1-4, which view being taken along upper edges of the guide grooves 10N3 corresponding to the third-step fiber inserting holes 3N3 and seen from the line V—V.

As shown in FIGS. 1-4 and 1-5, the optical fibers 2a1 to 2a5 of the optical fiber tape conductors 2a1 to 2a5 are inserted into the corresponding fiber inserting holes 3N1 to 3N5 in such a way that the exposed fiber side ends 2d2 to 2d5 of the tape members 2c1 to 2c5 are in contact with the contact portion 15, and supported by the fiber inserting holes 3N1 to 3N5.

While the optical fibers 2b1 to 2b5 are inserted into the corresponding fiber inserting holes 3N1 to 3N5, an adhesive agent is injected in the ferrule 1 via the window 8 to fix the optical fibers 2b1 to 2b5, thereby producing an optical connector C.

Next, operations based on the configurations of the ferrule 1 and connector C according to the present embodiment will be described below.

FIG. 1-6 is a view illustrating bends in optical fibers 54a2 and 54a3 while optical fibers 54a1 to 54a3 of multi-core optical fiber tape conductors 53a1 to 53a3 are inserted into the conventional first to third-step fiber inserting holes 51a1 to 51a3.

Specifically, a bend of the optical fiber 54ak at the $k^{th}$ step (k is an integer of 1 or more) can be expressed by a curvature radius r of the optical fiber 54ak. Then, the curvature radius r of the optical fibers 54ak can be expressed by using as parameters a distance Dk' between an exposed fiber side end 53bk of a $k^{th}$-step optical fiber tape conductor 53ak and guide grooves 52 of a corresponding fiber inserting holes 51ak, and a misalignment Gk' between the vertical position of the axis of the fiber inserting holes 51ak and the vertical center of the multi-core optical fiber tape conductor 53ak.

Next, a method for obtaining an approximate curvature radius of a bend will be described below.

As shown in FIG. 1-7, the trace of an optical fiber of which both ends (fixed points a) are misaligned (misalignment corresponding to the above-mentioned misalignment Gk: G) is made approximate to a sine curve in which one of the fixed points is an origin point of the x-y coordinate system. In other words, the trace of the optical fiber shown in FIG. 1-7 can be made approximate to a curve of cos function (y=cos x), in which one of the fixed points is an origin point, being inverted with a wavelength of 2D when the distance between the fixed points is D (corresponding to the above-mentioned distance Dk').

That is to say, $$y = -\cos\left(\frac{\pi x}{D}\right) \quad \text{EQUATION 1-2}$$

When a starting point of the equation 1-2 is matched to one fixed point, the equation 1-2 can be modified as follows:

$$y = 1 - \cos\left(\frac{\pi x}{D}\right) \quad \text{EQUATION 1-3}$$

As shown in FIG. 1-7, since the amplitude corresponds to G, the trace of the optical fiber is finally given by the following equation:

$$y = \frac{G}{2}\left(1 - \cos\left(\frac{\pi x}{D}\right)\right) \quad \text{EQUATION 1-4}$$

A curvature radius r at a point X of the trace which can be expressed by the X-Y coordinate system, is given by the following equation:

$$r = \frac{\{1+(dy/dx)^2\}^{\frac{3}{2}}}{\frac{d^2y}{dx^2}} \quad \text{EQUATION 1-5}$$

The curvature radius is minimized at both ends of the curve (in other words, a bend is maximized). Then, the equation 1-4 is twice differentiated, the result is substitute into the equation 1-5, and further, x=0 is substituted to calculate the equation 1-5, from which the following equation 1-6 is derived.

$$r = \frac{2D^2}{G\pi^2} \quad \text{EQUATION 1-6}$$

More specifically, since the bend of the optical fiber becomes larger in inverse proportion to the curvature radius r, as seen from the equation 1-6, the longer the distance D is, the larger the curvature radius r becomes, thereby reducing the bend.

On the other hand, in the conventional ferrule 50, as shown in FIG. 1-6, optical fibers 54a1 of the first-step optical fiber tape conductor 53a1 are inserted into the corresponding fiber inserting holes 51a1 in such a way that an exposed fiber side end 53b1 is brought into contact with the guide grooves 52 of the corresponding fiber inserting holes 51a1, and the second to fifth-step optical fibers 54a2 to 54a5 are inserted into the corresponding fiber inserting holes 51a2 to 51a5 in such a way that the positions of the exposed fiber side ends 53b2 to 53b5 along the axial direction of the fiber inserting holes are identical to the position of the exposed fiber side end 53b1 along the axial direction of the fiber inserting holes.

For this reason, a distance Dk' between an exposed fiber side end 53bk of the $k^{th}$-step optical fiber tape conductor 53ak (k is at least 2, i.e., k≧2) and guide grooves of fiber inserting holes 51ak can be expressed as in the equation 1-7, where L denotes a length of each of the guide grooves 52 at the $k^{th}$ step along the axial direction of the fiber inserting holes.

$$Dk'=L \times (k-1) \quad \text{EQUATION 1-7}$$

More specifically, the distance Dk' is extremely shorter since the distance depends on the length L of the guide groove 52 at the $k^{th}$ step along the axial direction of the fiber inserting holes, which may causes a large bend (distortion).

Accordingly, in an optical connector C which is assembled by inserting optical fibers 2b1 to 2b5 of the optical fiber tape conductors 2a1 to 2a5 into corresponding fiber inserting holes with the use of the conventional ferrule 50 and fixed the optical fibers therein, the optical fibers at the second step or later are susceptible to large bends (distortions). However, in the configuration of the present embodiment, as shown in FIGS. 1-4, 1-5, 1-8 and the like, a contact portion 15 is formed spaced by a predetermined distance Dk (D1 to D5) from one ends E1 to E5 of the guide grooves 10N1 to 10N5 opposed to the fiber inserting holes along the axial direction of the fiber inserting holes 3N1 to 3N5 of the respective steps. For this reason, when the optical fibers 2b1 to 2b5 of the optical fiber tape conductors 2a1 to 2a5 are inserted into the respective fiber inserting holes 3N1 to 3N5, the exposed fiber side ends (end faces) 2d1 to 2d5 of tape members 2c1 to 2c5 of the optical fiber tape conductors 2a1 to 2a5 are fixed in contact with the contact portion 15.

Or, in the configuration of the present embodiment, the distance Dk between the exposed fiber side end 2dk of the $k^{th}$-step optical fiber tape conductors 2ak and ends Ek of the guide grooves 10Nk of the corresponding fiber inserting holes 3Nk can be expressed by an arrangement position of the contact portion 15 along the axial direction of the fiber inserting holes, in other words, a distance Dk (D1 to D5) from the contact portion 15 to the ends Ek of the guide grooves 10Nk along the axial direction of the fiber inserting holes 3Nk.

Accordingly, by lengthening enough the distance Dk between the exposed fiber side end 2dk of the optical fiber tape conductor 2ak of the $k^{th}$ step and the ends Ek of the guide grooves 10Nk along the axial direction of the fiber inserting holes 3Nk, corresponding to the distance of the contact portion 15, to enlarge the curvature radii r of the optical fibers 2b1 to 2b5 of the respective steps, it is possible to minimize bends (distortions) created in the optical fibers 2b1 to 2b5.

In general, bends created in the optical fibers 2b1 to 2b5 are known such as have little effects on the optical characteristics and intensity of the optical fibers when the curvature radius r is equal to or more than 30 mm.

Therefore, in the present embodiment, the distance Dk between the exposed fiber side end 2dk of the optical fiber tape conductor 2ak of the $k^{th}$ step and the ends Ek of the guide grooves 10Nk of the fiber inserting holes 3Nk is determined so as to have curvature radius r of at least 30 mm.

For instance, in the present embodiment, a misalignment Gk of $k^{th}$-step optical fibers (1≦k≦5) is expressed by the equation 1-1 {Gk=0.05(k−1)+α} using a difference 0.05 between a vertical fiber pitch and a thickness of a tape member. When a length L of each guide groove of 10N1 to 10N5 along the axial direction of the fiber inserting holes is 0.3 mm (L=0.3 mm), the above-mentioned equation (1-6) is used to determine a distance Dk which satisfies r≧30 mm, of which results are shown in Table 1-1.

TABLE 1-1

| Step | Distance Dt (mm) | Curvature Radius r (mm) |
|---|---|---|
| 5 | D5 = 5.44 | ≧30 |
| 4 | D4 = 4.72 | ≧30 |
| 3 | D3 = 3.85 | ≧30 |
| 2 | D2 = 2.72 | ≧30 |
| 1 | D1 = 0 | ≧30 |

In the ferrule 1 of the present embodiment, if a distance from a contact side face 5a to the end E5 of a fifth-step guide groove 10N5 along the axial direction of the fiber inserting holes is 2.0 mm, a distance from the contact side face 5a to the end E4 of a fourth-step guide groove 10N4 along the axial direction of the fiber inserting holes is 2.3 mm, a distance from the contact side face 5a to the end E3 of a third-step guide groove 10N3 along the axial direction of the fiber inserting holes is 2.6 mm, a distance from the contact side face 5a to the end E2 of a second-step guide groove 10N2 along the axial direction of the fiber inserting holes is 2.9 mm, and a distance from the contact side face 5a to the end E1 of a first-step guide groove 10N1 along the axial direction of the fiber inserting holes is 3.2 mm.

Accordingly, distances Ds1 to Ds5 between the ferrule side face 5a of the first to fifth steps and the exposed fiber side ends 2d1 to 2d5 of the optical fiber tape conductors 2a1 to 2a5 of the first to fifth steps and the other end Ek of the guide groove 10Nk of the fiber inserting hole 3Nk are determined as shown in the following table 1-2.

TABLE 1-2

| Step | Distance D (mm) | Curvature Radius r (mm) |
|---|---|---|
| 5 | Ds5 = 7.44 | ≧30 |
| 4 | Ds4 = 7.02 | ≧30 |
| 3 | Ds3 = 6.45 | ≧30 |
| 2 | Ds2 = 5.62 | ≧30 |
| 1 | Ds1 = 3.20 | ≧30 |

In other words, when the distances Ds1 to Ds5 from the ferrule side face 5a to the exposed fiber side ends 2d1 to 2d5 of the first to fifth step fiber tape conductors 2a1 to 2a5 are set as shown in the table 1-2 (Ds1=3.20 mm to Ds5=7.44 mm), respectively, it is possible to have the curvature radii of the bends of the optical fibers 2b1 to 2b5 more than 30 mm.

However, it is difficult to set the distances Ds1 to Ds5 from the ferrule side face 5a to the exposed fiber side ends 2d1 to 2d5 of the first to fifth-step fiber tape conductors 2a1 to 2a5 at different values in steps.

Then, in the present embodiment, the longest distance Ds5 (of the fifth step) among the distances Ds1 to Ds5 from the ferrule side face 5a to the exposed fiber side ends 2d1 to 2d5 of the first to fifth-step fiber tape conductors 2a1 to 2a5 is set as a common value for the distances Ds1 to Ds5 from the ferrule side face 5a to the exposed fiber side ends 2d1 to 2d5 of the first to fifth-step fiber tape conductors 2a1 to 2a5.

In other words, the distance D from the contact side face 5a to the contact portion 15 along the axial direction of the fiber insertion holes is set at Ds5=7.44 (mm).

As a result, in the present embodiment, since the exposed fiber side ends 2d1 to 2d5 in the tape members 2c1 to 2c5 of the first to fifth-step fiber tape conductors 2a1 to 2a5 are fixed in contact with the contact portion 15, the exposed fiber side ends 2d1 to 2d5 can be fixed at a position such that the curvature radius r of each of the respective optical fibers 2b1 to 2b5 is at least 30 mm.

Accordingly, bends of the optical fibers 2b1 to 2b5 can be minimized so as not to affect optical characteristics and intensity of the optical fibers 2b1 to 2b5.

Therefore, it is possible to prevent the optical characteristics and intensity from being degraded by bends of the optical fibers 2b1 to 2b5 caused by molding distortion, distortion due to change in temperature or moisture taking or the like, thereby keeping high reliability of a whole ferrule 1 and a whole optical connector C.

The distance (D=7.44 mm) between the contact side face 5a and the contact portion 15 along the axial direction of the fiber inserting holes has been referred to as an example here, and it is needless to say that the present invention is not limited to this value as it is.

Further in the present embodiment, a reliable tolerance of the curvature radii of the bends created on the optical fibers 2b1 to 2b5 is set at least 30 mm and the distance D between the contact side face 5a and the contact portion 15 along the axial direction of the fiber inserting holes is set so as to have the curvature radii r of 30 mm or larger. However, these are not for limiting the present invention.

In other words, even when the above-mentioned curvature radii r of below 30 mm is tolerated for such a reason that the reliability is sacrificed to some degree so as to miniaturize a ferrule itself, the distance D between the contact side face 5a and the contact portion 15 along the axial direction of the fiber inserting holes has only to be determined so as to satisfy such a requirement of the curvature radius r.

Furthermore, in the present embodiment, description has been made on a 60-core ferrule having 12-core fiber inserting holes arranged at first to fifth steps and an optical connector using this 60-core ferrule. However, these are for limiting the present invention. The present invention can apply to a ferrule having multi-core fiber inserting holes arranged at plural steps and an optical connector using this ferrule.

FIG. 2-1 is a schematic perspective view illustrating a configuration of an optical connector ferrule (hereinafter referred to simply as a "ferrule") 1 for assembling an optical connector C according to an embodiment of the present invention and a configuration of a plurality of optical fiber tapes (five optical fiber tape conductors 2a1 to 2a5 in this embodiment) which are inserted into the ferrule to be fixedly supported.

Further, FIG. 2-2 is a vertical sectional view of the ferrule 1 shown in FIG. 2-1 taken along the line passing through the centers of vertically aligned fiber inserting holes 3 or the line II—II.

As shown in FIGS. 2-1 and 2-2, the ferrule 1 has the shape of a square and is integrally formed by molding with a material of plastic resin, for example.

Hereinafter in this embodiment, plural fiber inserting holes 3 are also indicated by 3N1 for first-step fiber inserting holes and in the same way, 3N2 to 3N5 for second to fifth-step fiber inserting holes.

The ferrule 1 has a first side face 5 including openings of a plurality of fiber inserting holes 3 arranged at plural steps, this first side face being a contact side face to another optical device such as an optical connector, optical module or the like. The ferrule 1 has a second side face 6 (upper surface shown in FIG. 2-1) provided in contact with an upper edge end of the first side face 5 and extending along the axial direction of the fiber holes, the second side face having a window 7 for injecting an optical fiber fixing member (for example, an adhesive agent) into the ferrule while optical fibers of each fiber tape 2 are inserted into corresponding fiber inserting holes 3.

Further, the ferrule 1 has a slot 8 formed at a face opposed to the first side face 5 for receiving the optical fiber tape 2 and a flange portion 9 formed at the outer edge of the slot 8.

The optical fiber tape conductors 2a1 to 2a5, as shown in FIG. 2-1, each includes a plurality of (12-core) optical fibers corresponding to the plural (12-core) fiber inserting holes and a corresponding tape member (2c1 to 2c5) for covering the optical fibers. The tape members 2c1 to 2c5 which are located at one end of the optical fiber tape conductors 2a1 to 2a5 are peeled off to expose the optical fibers 2b1 to 2b5 (bare fibers).

Each of the fiber inserting holes 3N1 to 3N5 has a hole diameter approximately identical to the diameter of each of the optical fibers 2b1 to 2b5 so as to insert the optical fibers 2b1 to 2b5 into the corresponding fiber inserting holes 3N1 to 3N5.

The first to fifth-step optical fibers 2b1 to 2b5 of the optical fiber tapes conductors 2a1 to 2a5 are inserted into the first to fifth-step fiber inserting holes 3N1 to 3N5 of the thus composed ferrule 1 through the slot 8 and a receiving potion 11. In inserting, the optical fibers 2b1 to 2b5 are supported by the aforementioned fiber inserting holes 3N1 to 3N5.

While the optical fibers 2b1 to 2b5 are supported by the aforementioned fiber inserting holes 3N1 to 3N5, an adhesive agent is injected into the ferrule via the window 7 to fix the optical fibers 2b1 to 2b5, thereby completing an optical connector C.

FIG. 2-3 is a vertical sectional view of the ferrule 1 and optical fiber tape conductors 2a1 to 2a5, in assembling the aforementioned optical connector C, of which first to fifth-step optical fibers 2*b*1 to 2*b*5 of the optical fiber tapes conductors 2*a*1 to 2*a*5 are inserted into the first to fifth-step fiber inserting holes 3N1 to 3N5 of the ferrule 1, said view being taken along the line passing through the centers of vertically aligned fiber inserting holes 3 or the line II—II.

Also in the present embodiment, as shown in FIG. 2-3, the thickness w1 of each of the tape member 2*c*1 to 2*c*5 is in the order of 0.3 mm, for example, which is larger than 0.25 mm, space w2 between two vertically aligned fiber inserting holes 3. For this reason, when optical fibers 2*b*1 to 2*b*5 of the optical fiber tape conductors 2*a*1 to 2*a*5 are inserted into the respective fiber inserting holes 3N1 to 3N5 in such a manner that the vertical misalignment between the central axis of a first-step fiber inserting hole 3N1 and the center of the exposed fiber side end of the tape member 2*c*1 corresponding to an optical fibers 2*b*1 inserted in the fiber inserting holes 3N1 becomes 0, there might occur bends in the optical fibers 2*b*2 to 2*b*5 inserted into the second to fifth step fiber inserting holes 3N2 to 3N5, as shown in FIG. 2-3.

However, in the present embodiment, an approximate curvature radius r of each of bends of the optical fibers 2*b*2 to 2*b*5 inserted in the respective fiber inserting holes 3N2 to 3N5 is obtained, and each of the lengths L1 to L5 of the guide grooves 10N1 to 10N5 along the axis of the fiber inserting holes is determined in such a way that the curvature radius r of the bend becomes 30 mm or larger.

Now, a determining method of the lengths L1 to L5 of the guide grooves 10N1 to 10N5 along the axis of the fiber inserting holes will be described below.

The curvature radii r of the bends of optical fibers are obtained by using an approximate equation of the curvature radius r derived from the above-mentioned equations 1-2 to 1-6.

Figures 1, 2, 3, 4:
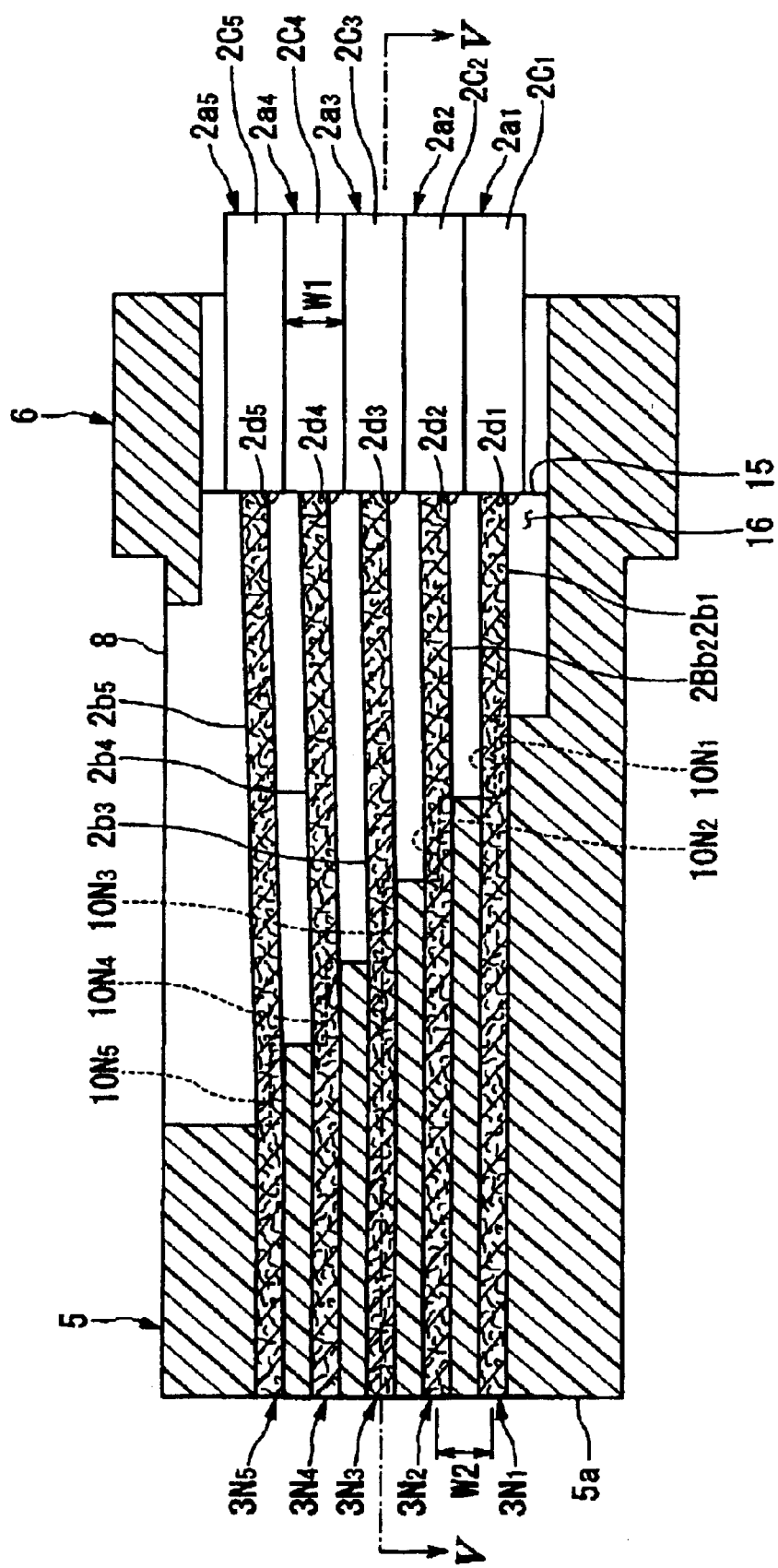
Figures 1, 2, 3, 4, 5:
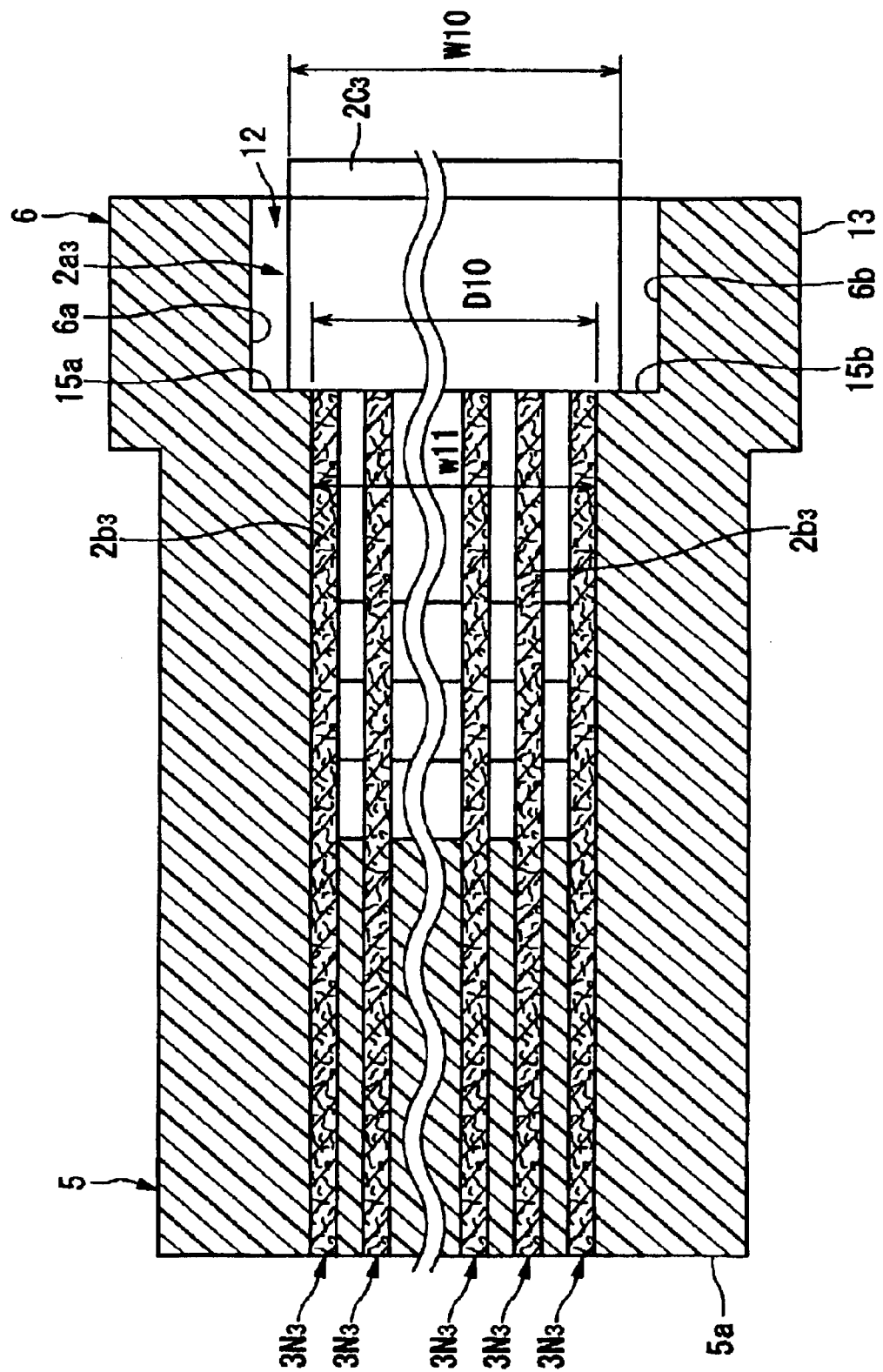
Figures 1, 2, 3, 4, 5, 6:
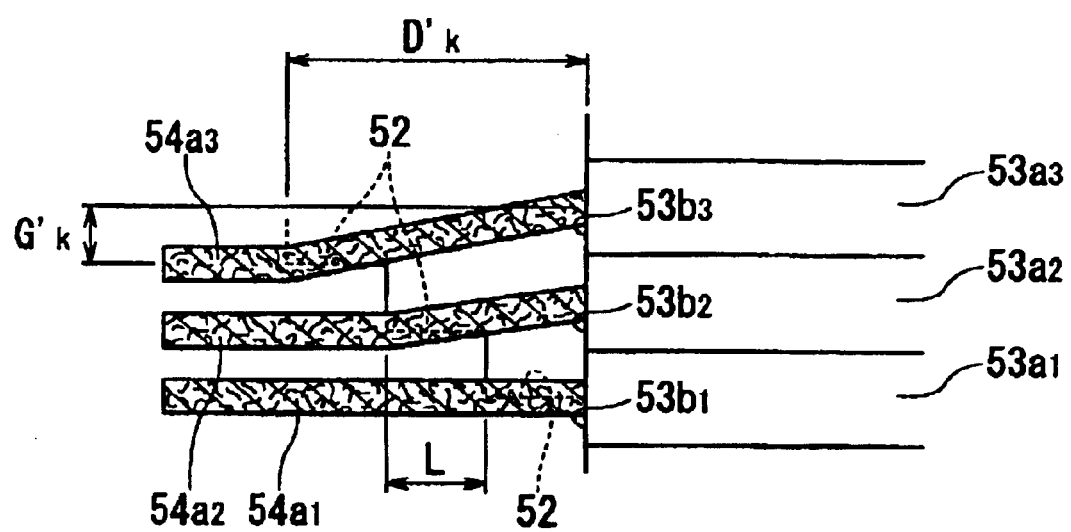
Figures 1, 2, 3, 4, 5, 6, 7:
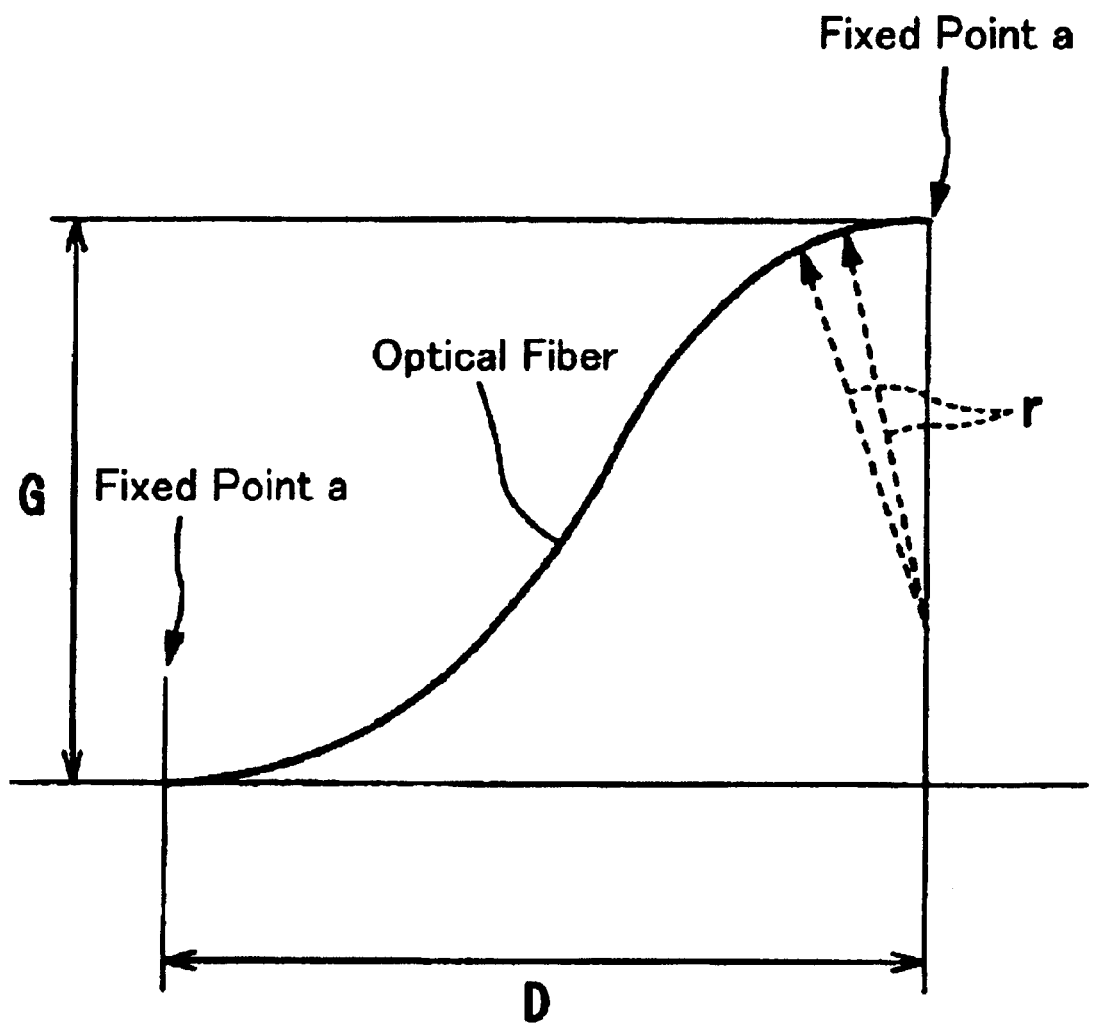
Figures 1, 2, 3, 4, 5, 6, 7, 8:
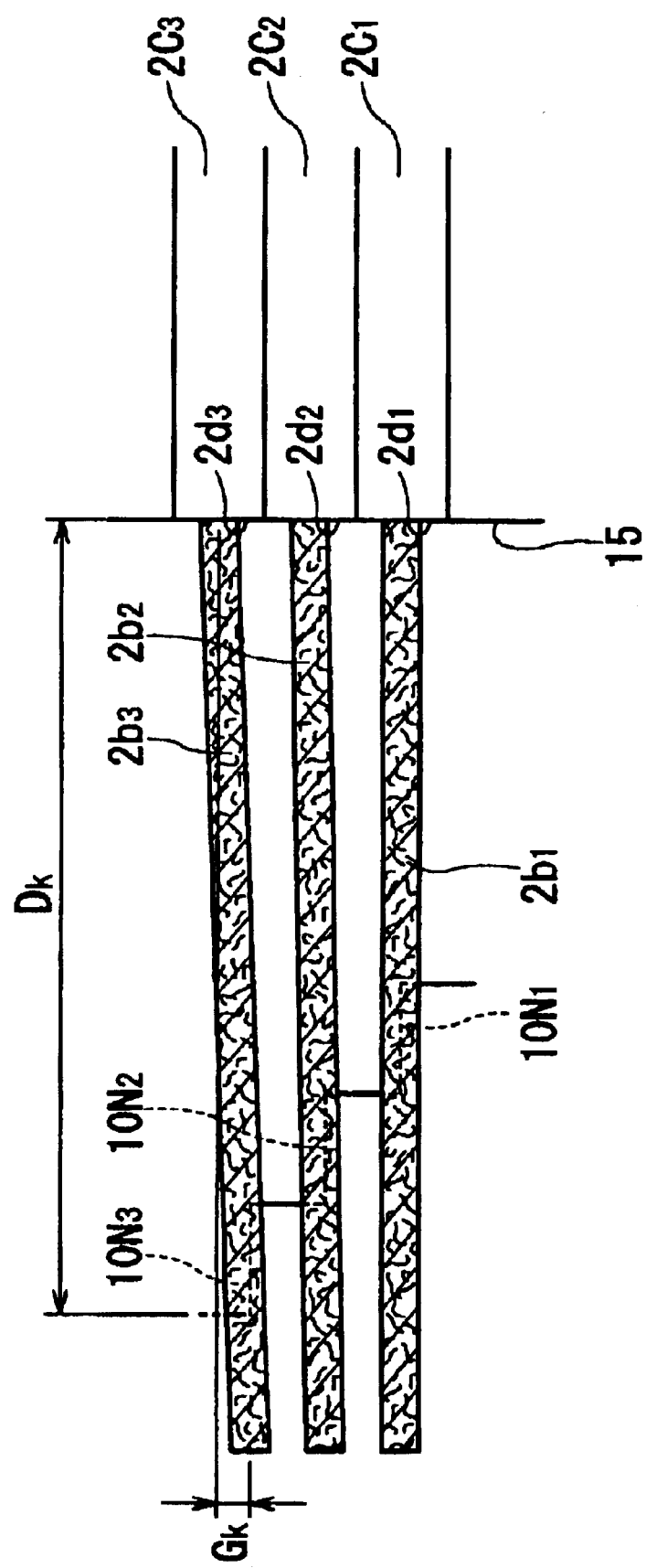
Figures 1, 2, 3, 4, 5, 6, 7, 8, 9:
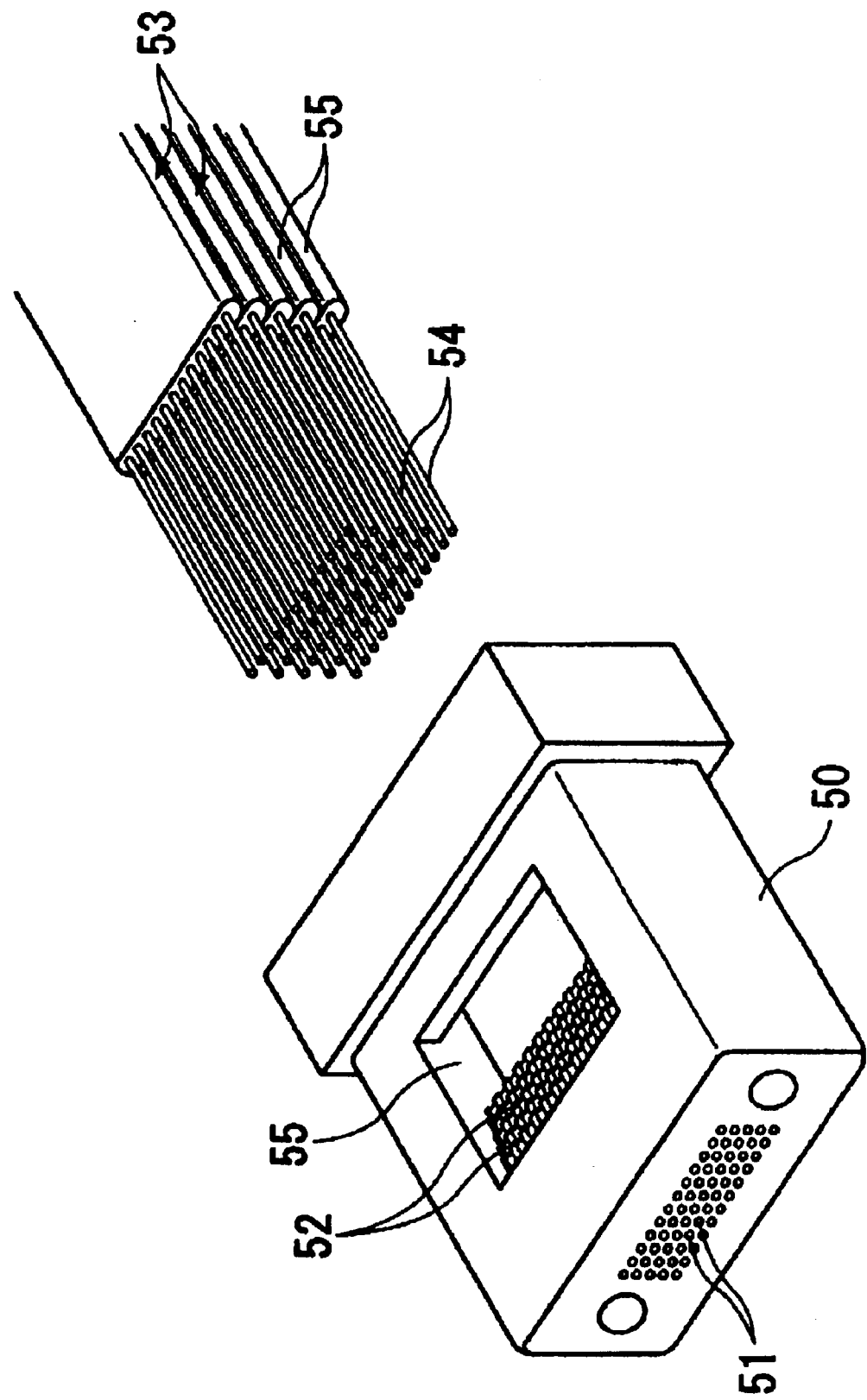
Figures 1, 2, 3, 4, 5, 6, 7, 8, 9, 10:
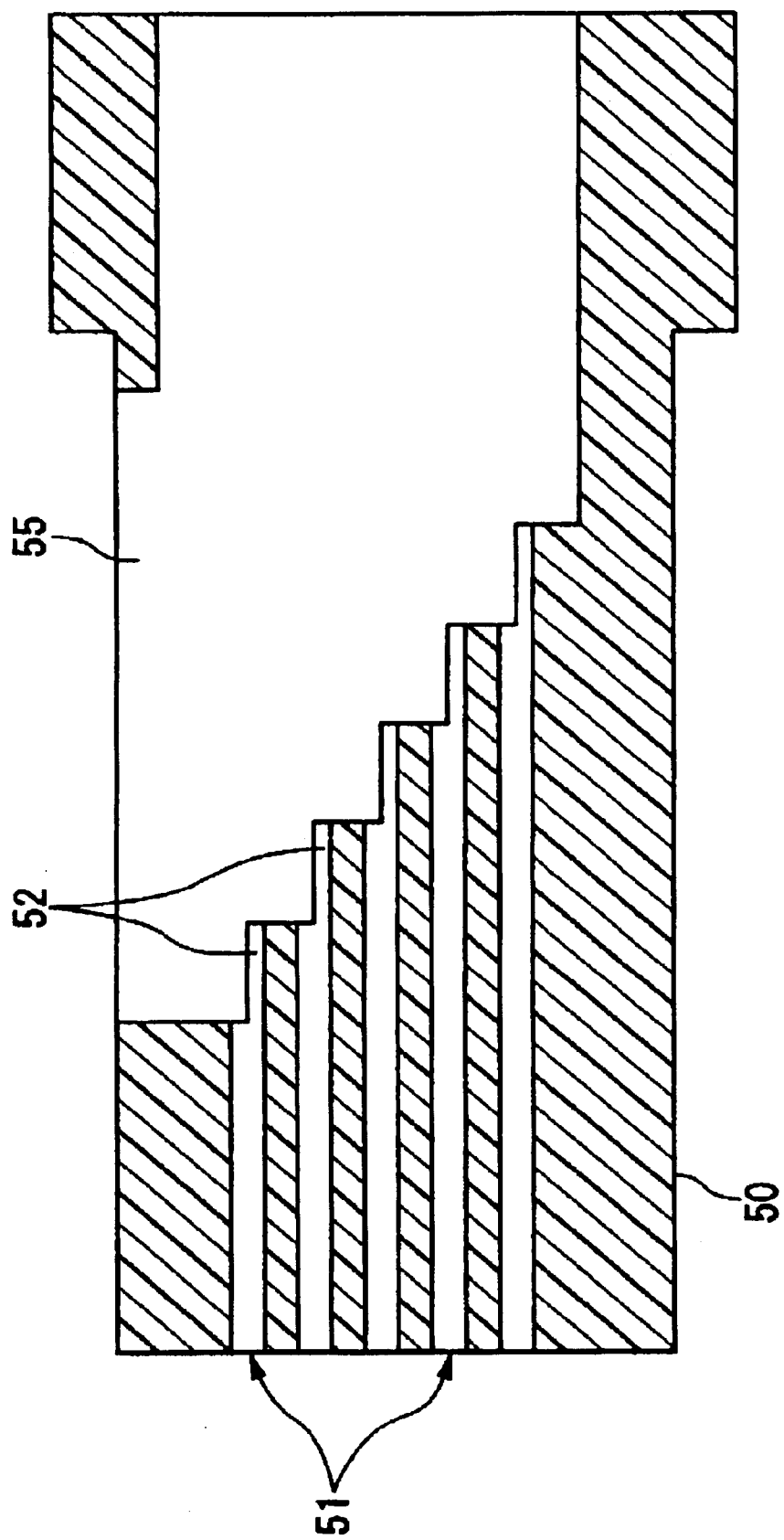
Figures 1, 2, 3, 4, 5, 6, 7, 8, 9, 10, 11:
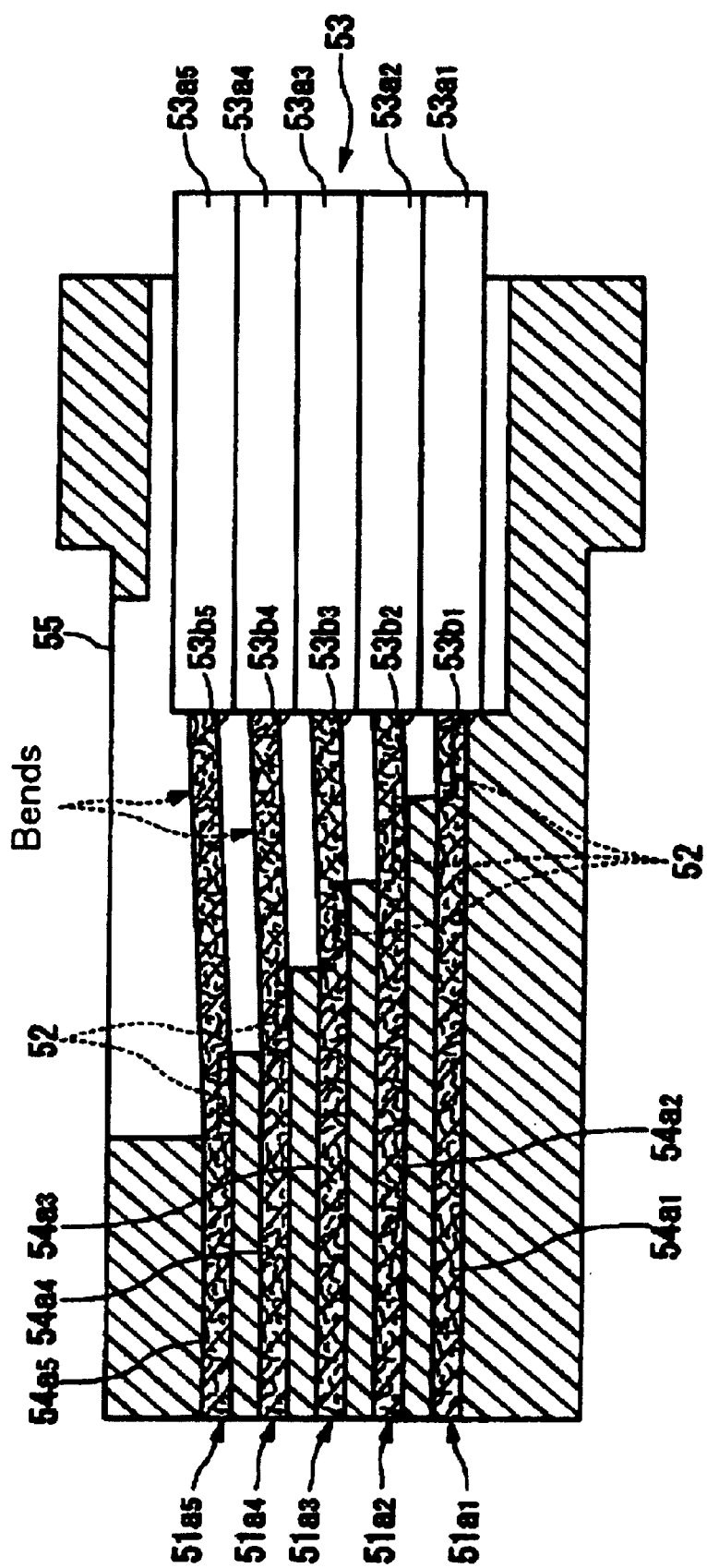
Figures 1, 2:
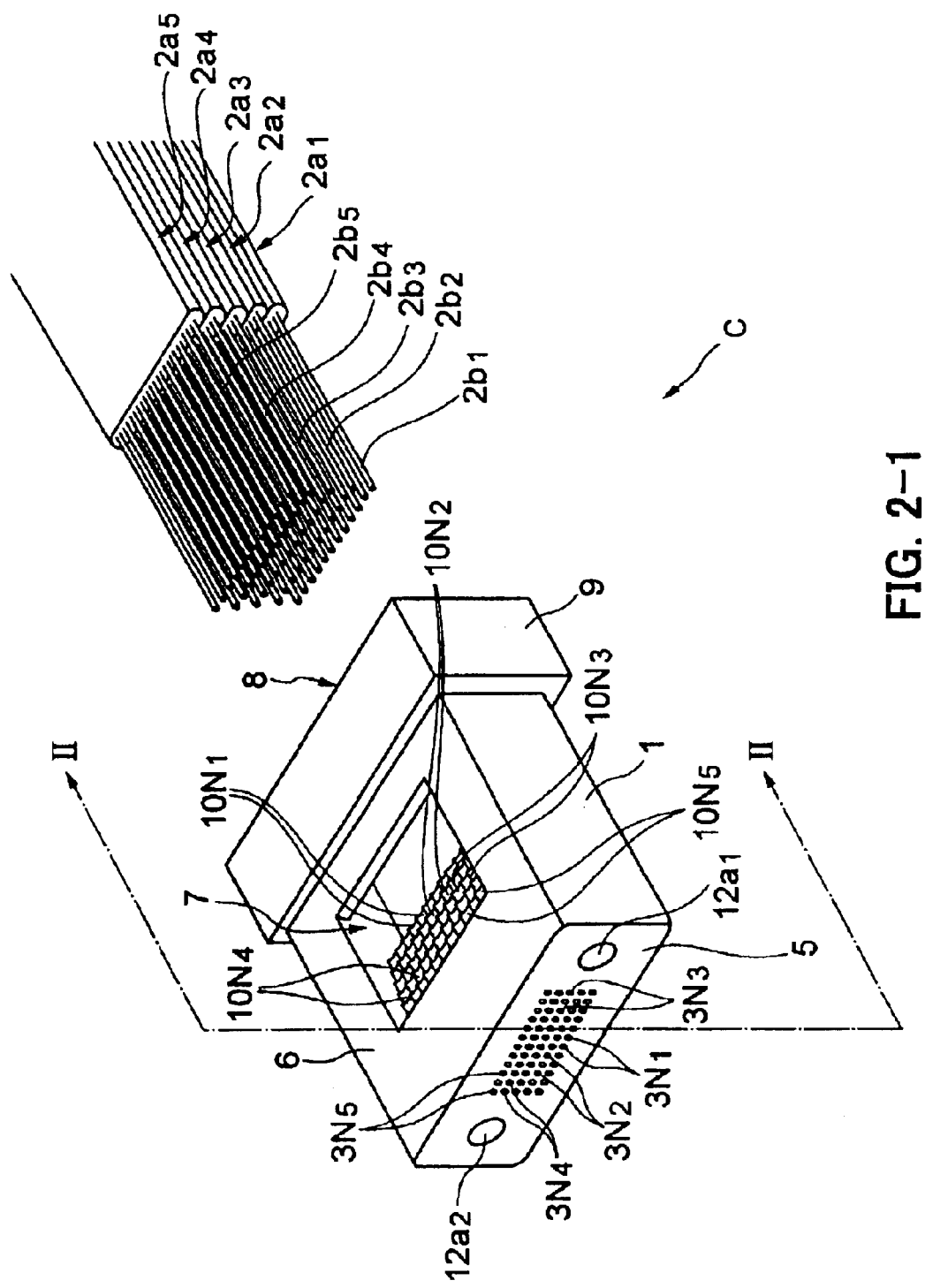
Figure 2:
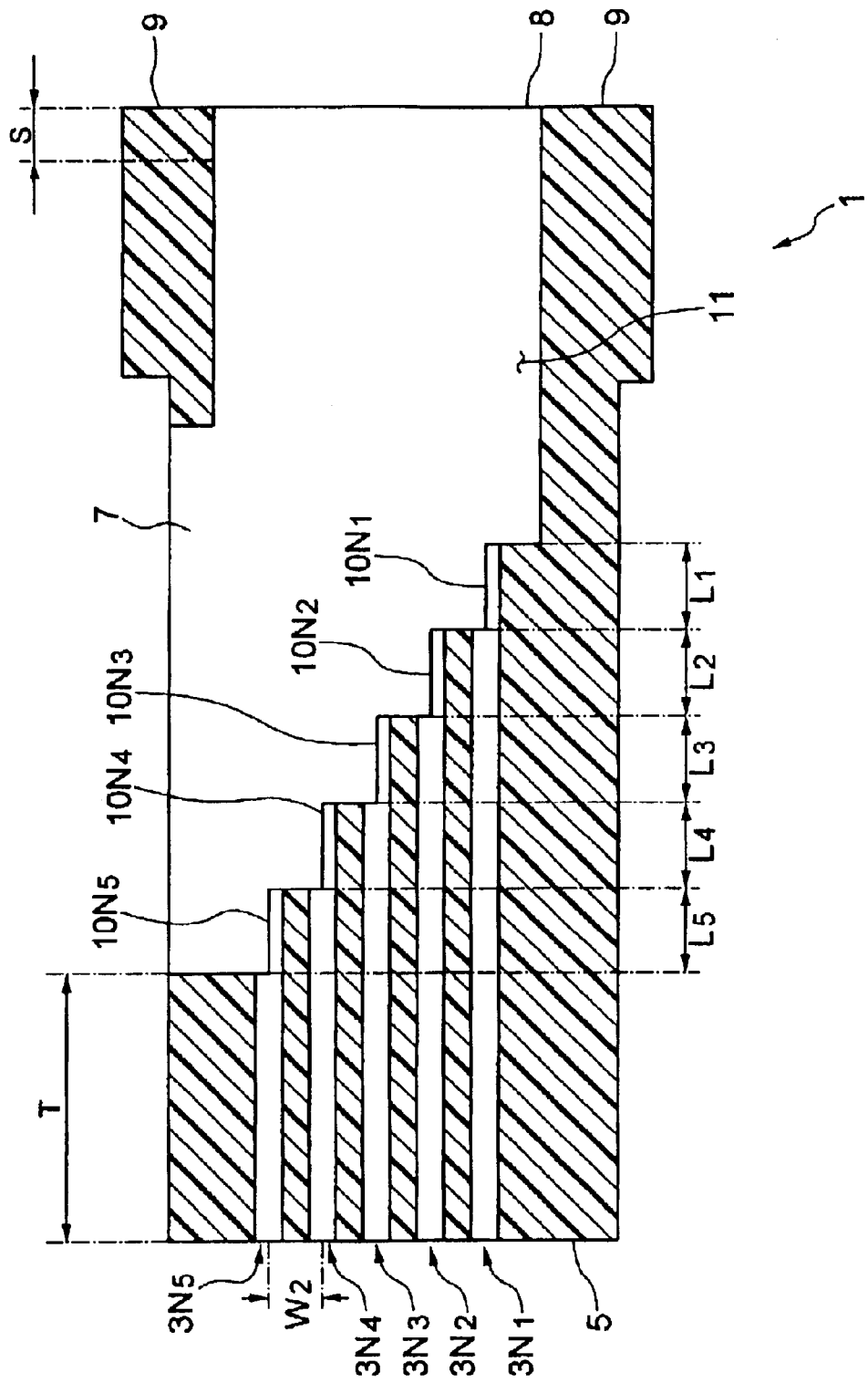
Figures 2, 3:
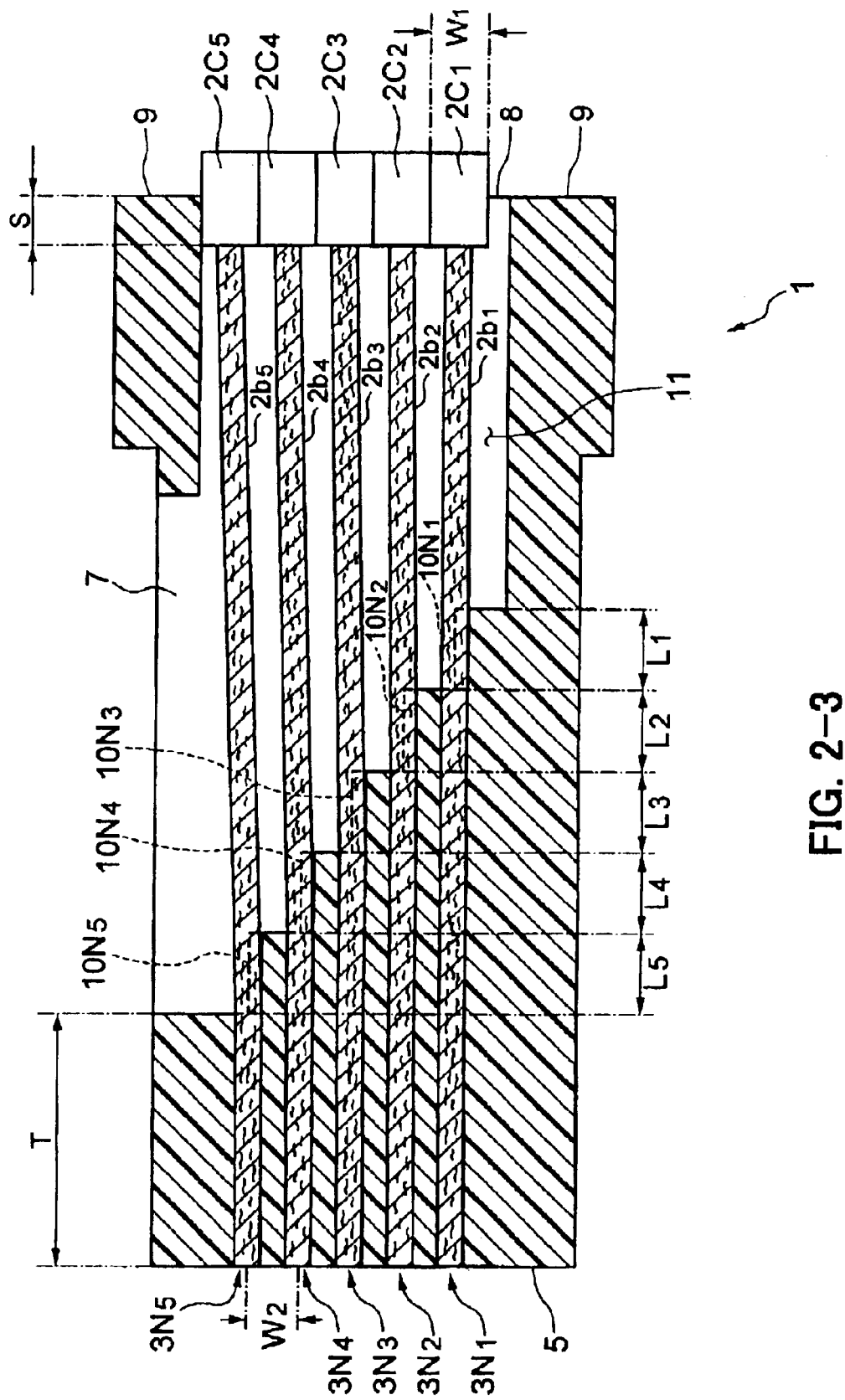
Figures 2, 3, 4:
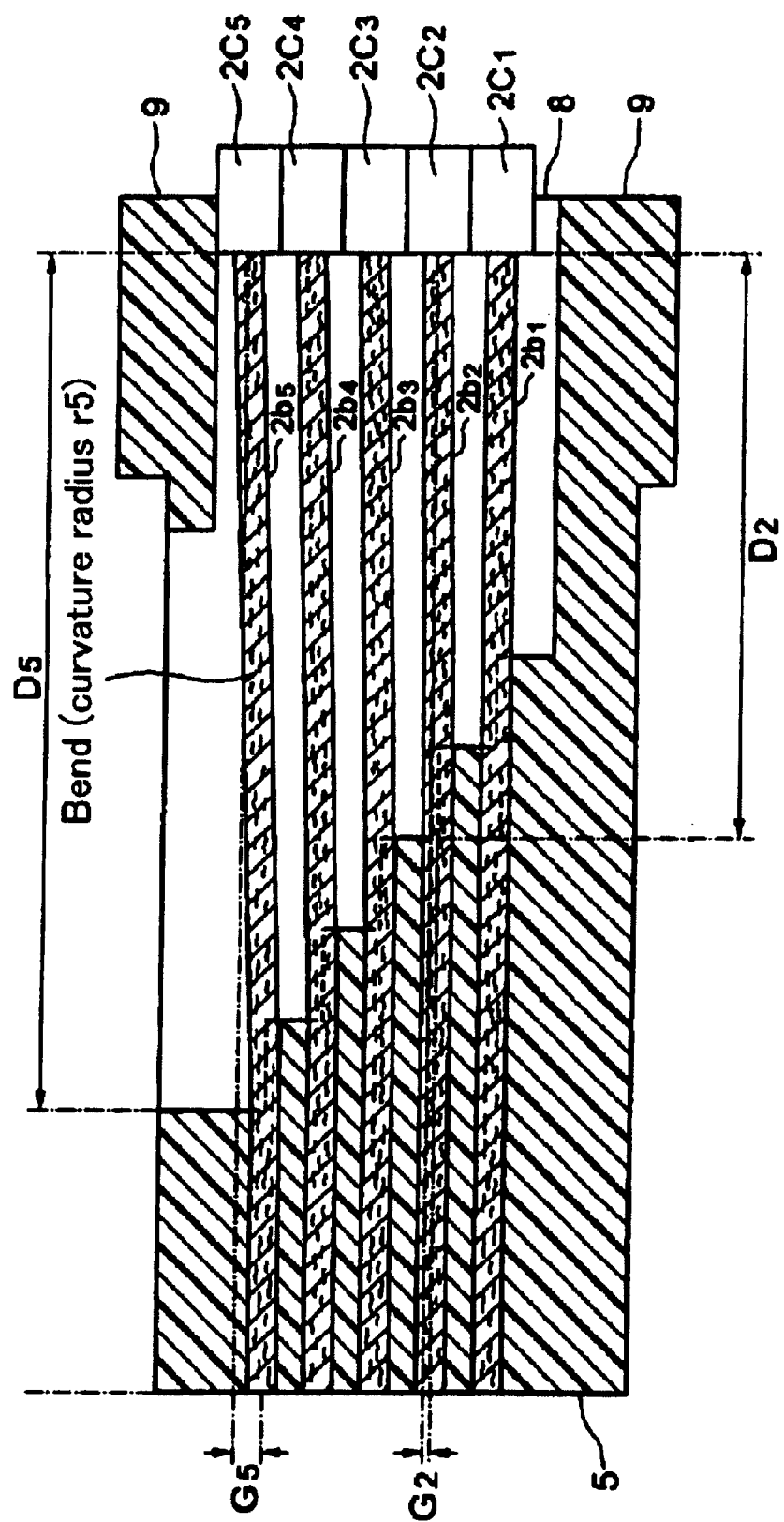
Figures 2, 3, 4, 5:
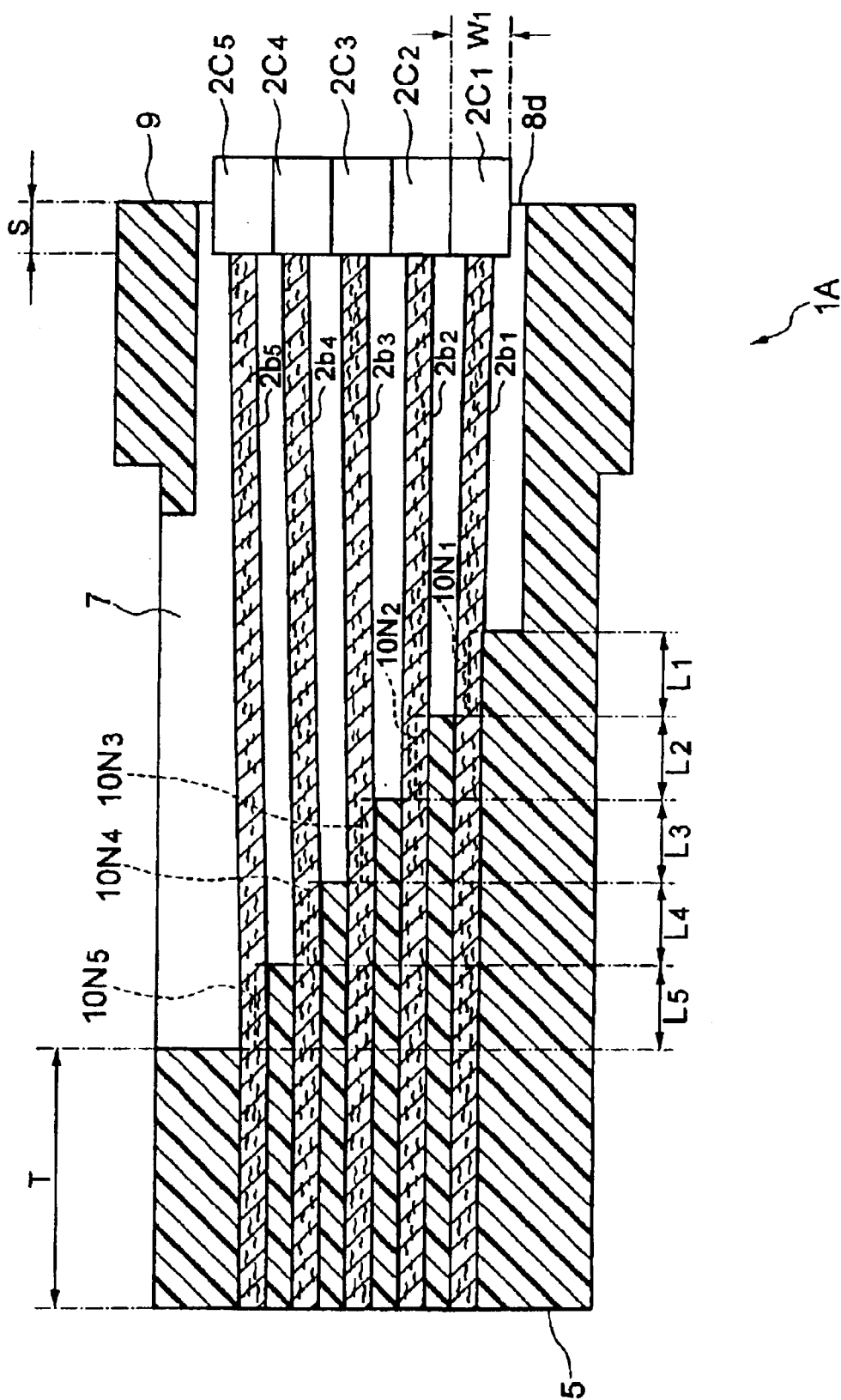
Figures 2, 3, 4, 5, 6:
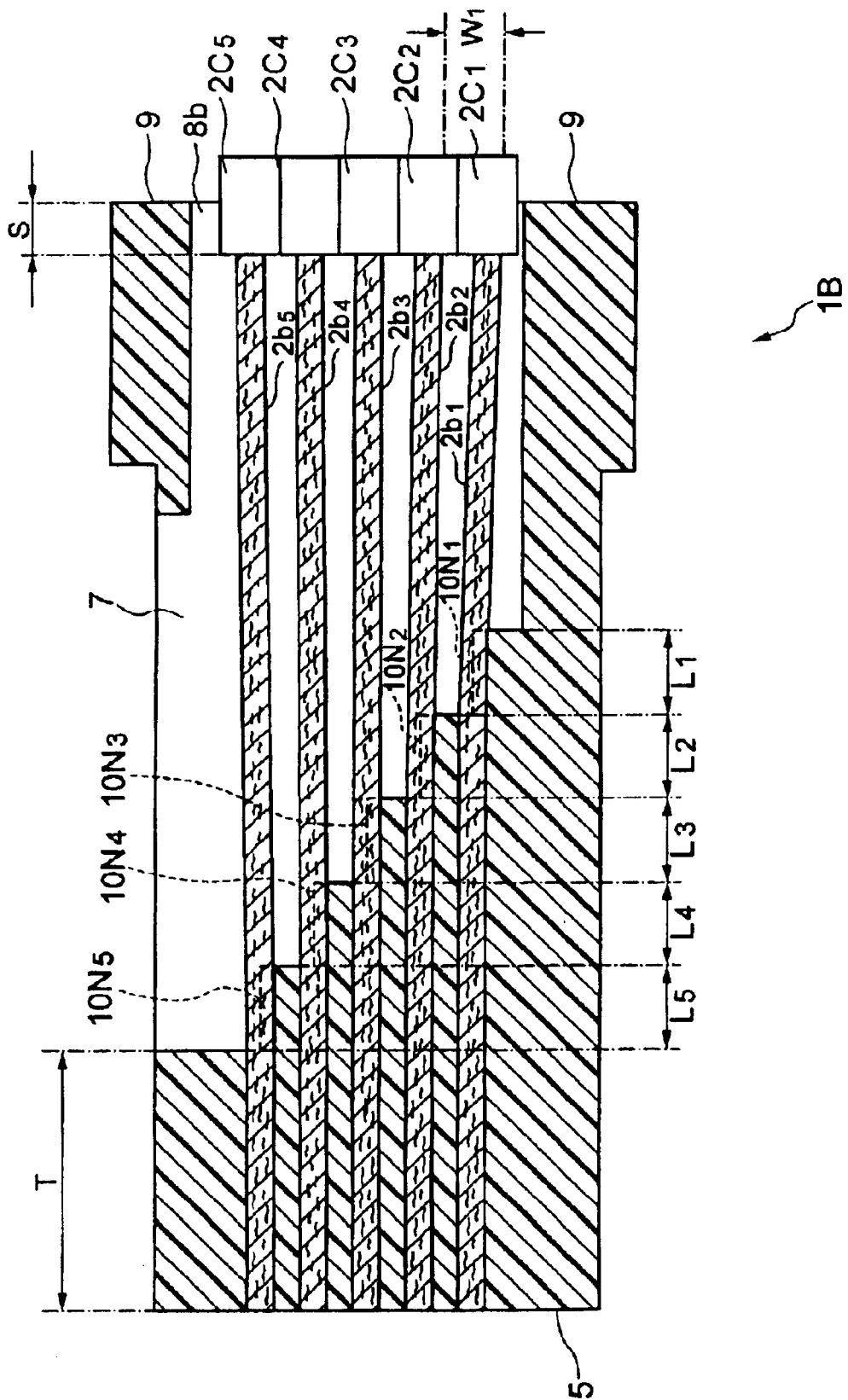
Figures 2, 3, 4, 5, 6, 7, 7A:
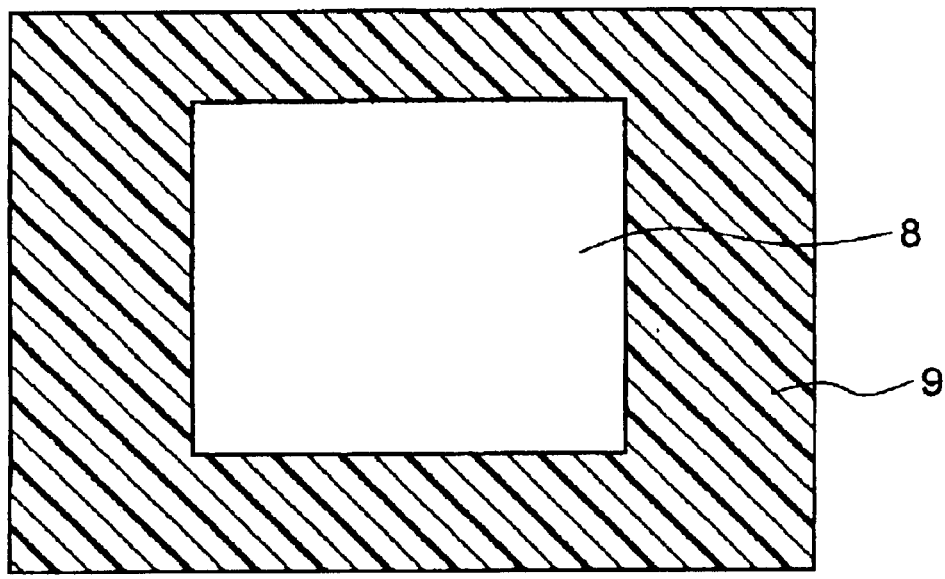
Figures 2, 3, 4, 5, 6, 7, 7B:
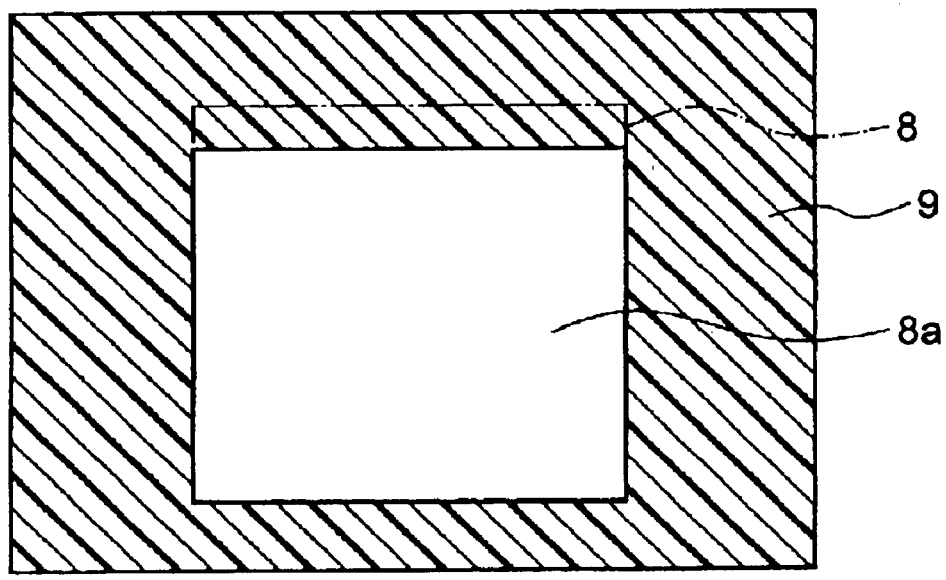
Figures 2, 3, 4, 5, 6, 7, 8:
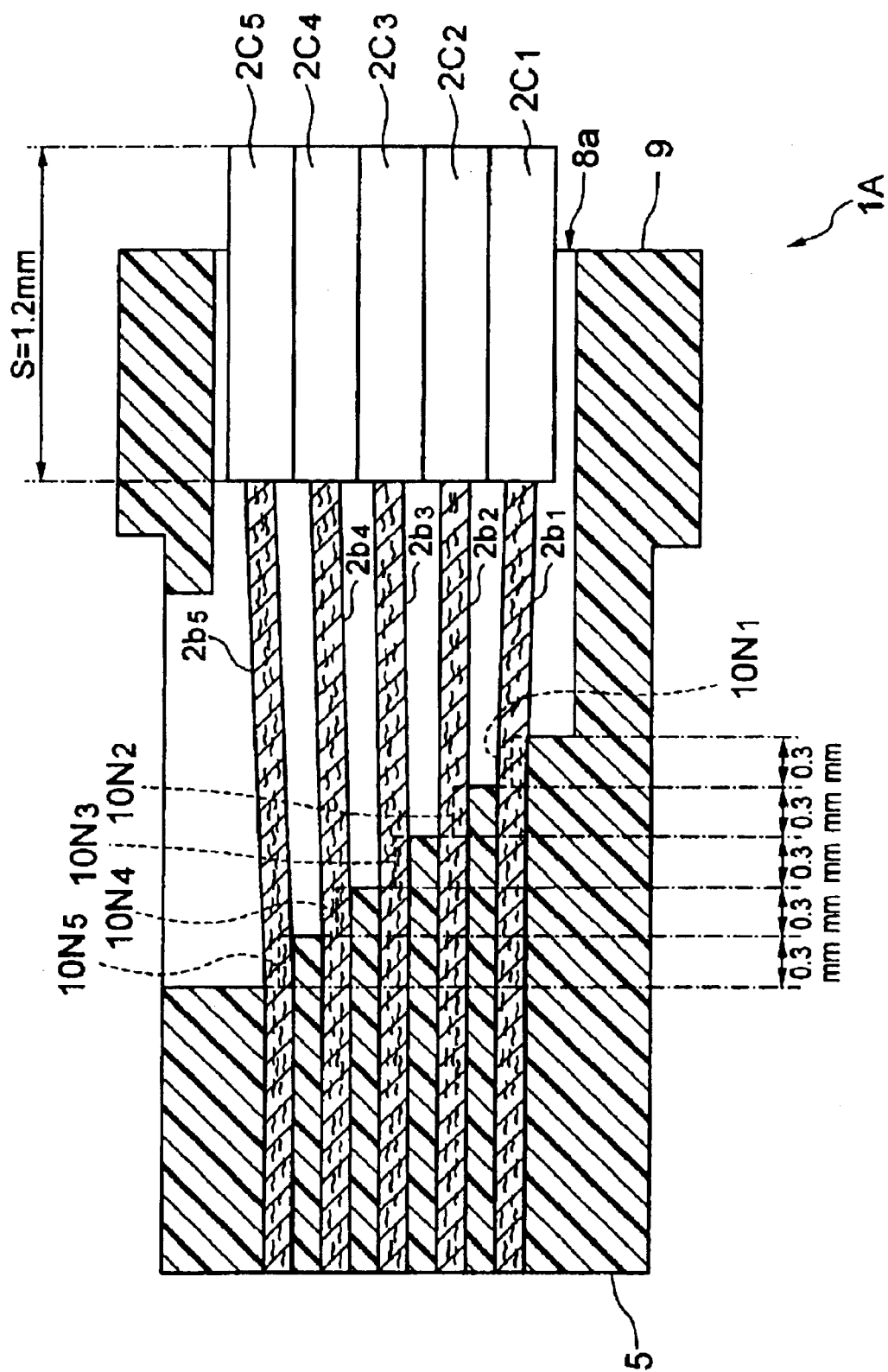
Figures 2, 3, 4, 5, 6, 7, 8, 9:
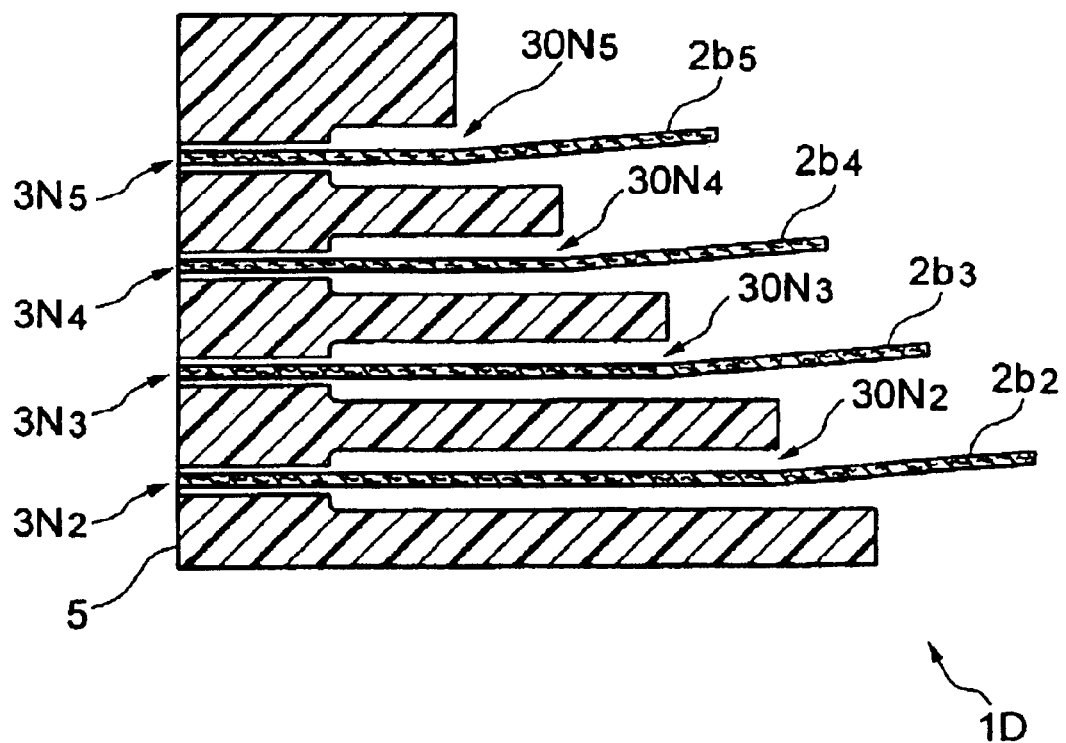
Figures 1, 3:
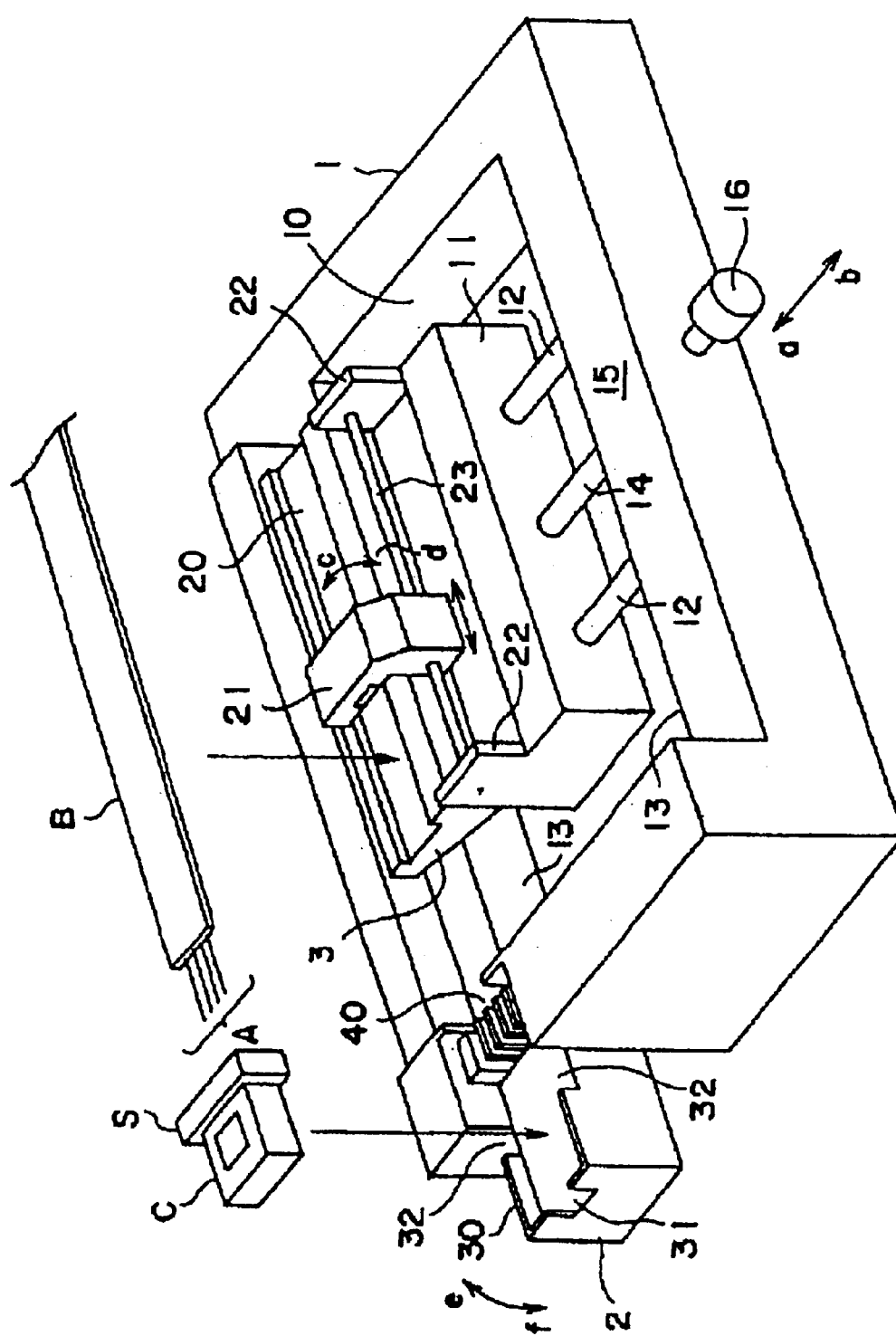
Figures 2, 3:
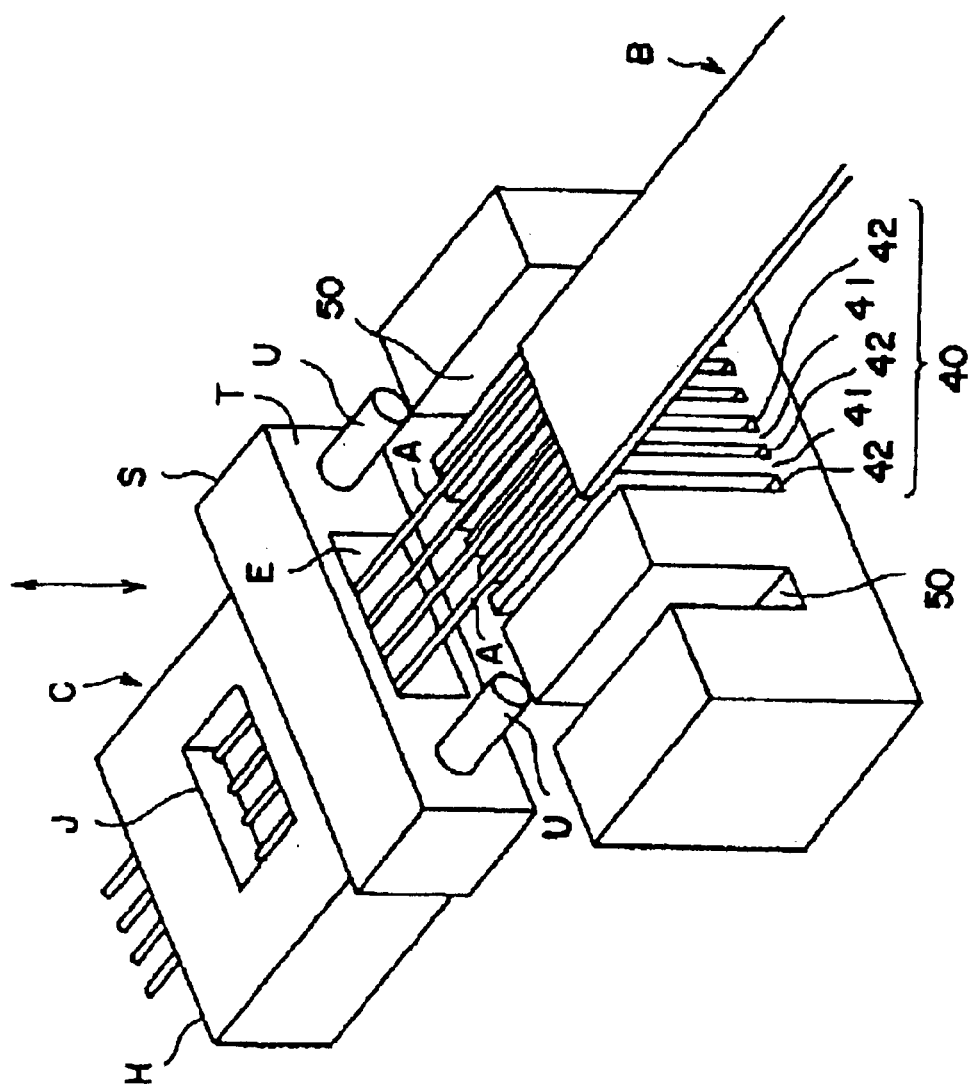
Figure 3:
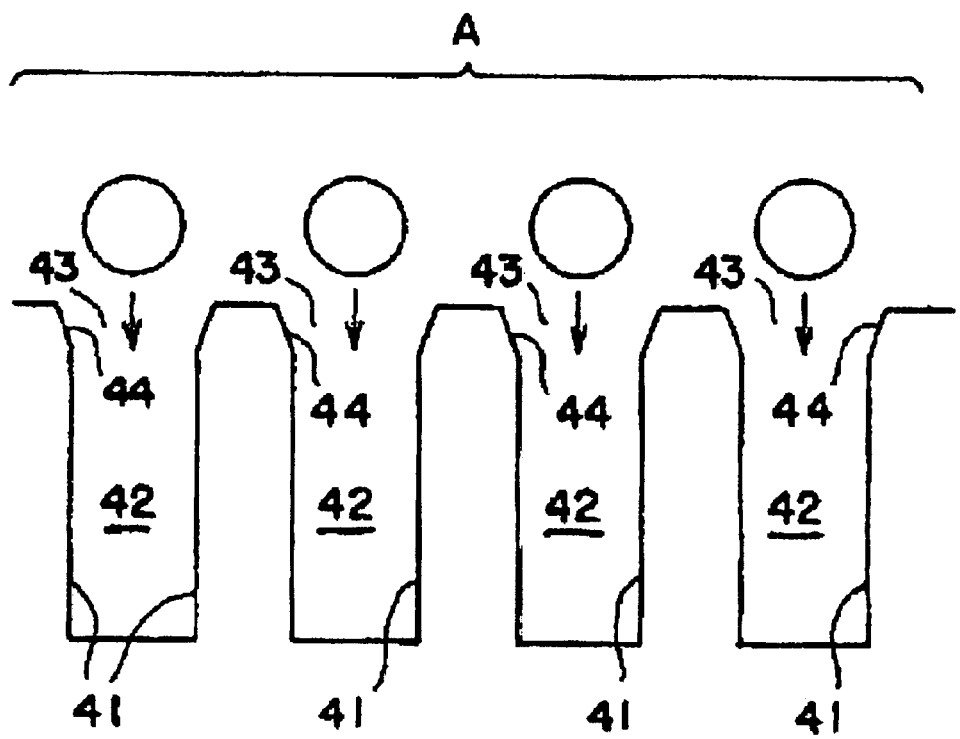
Figures 3, 4:
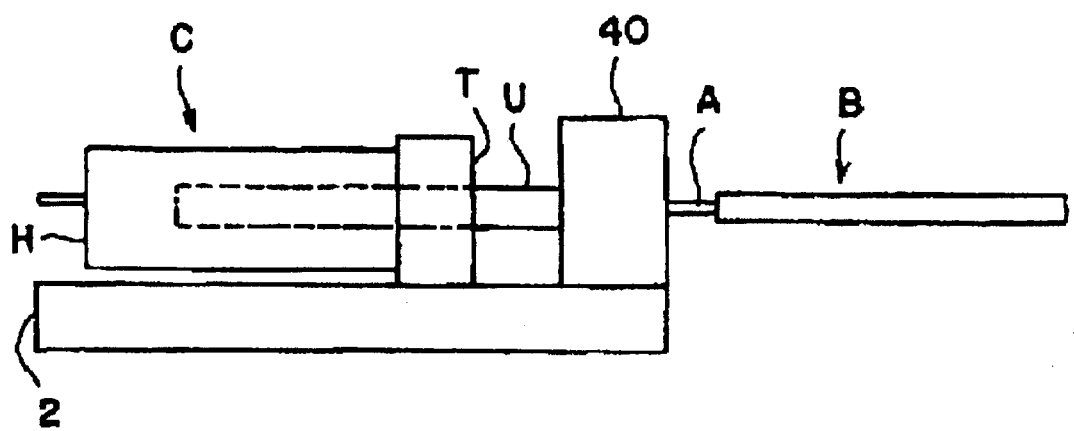
Figures 3, 4, 5, 5A:
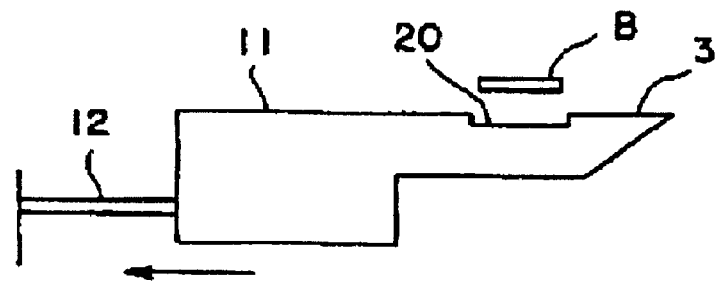
Figures 3, 4, 5, 5B:
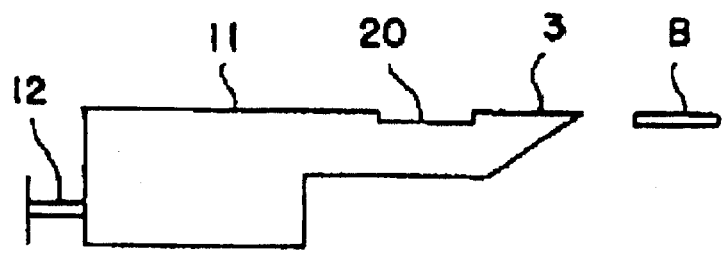
Figures 3, 4, 5, 5C:
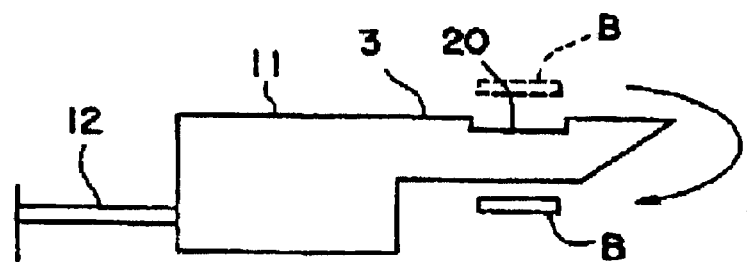
Figures 3, 4, 5, 6, 6A:
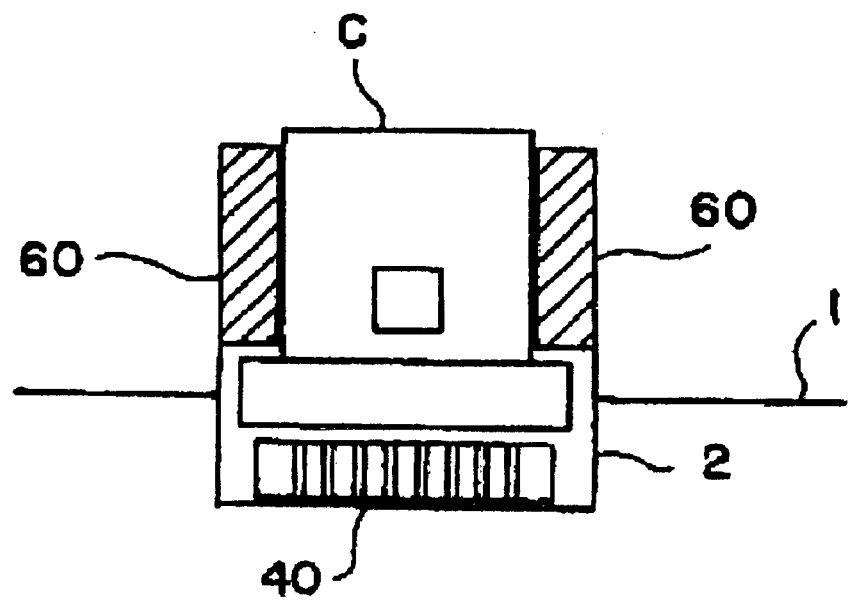
Figures 3, 4, 5, 6, 6B:
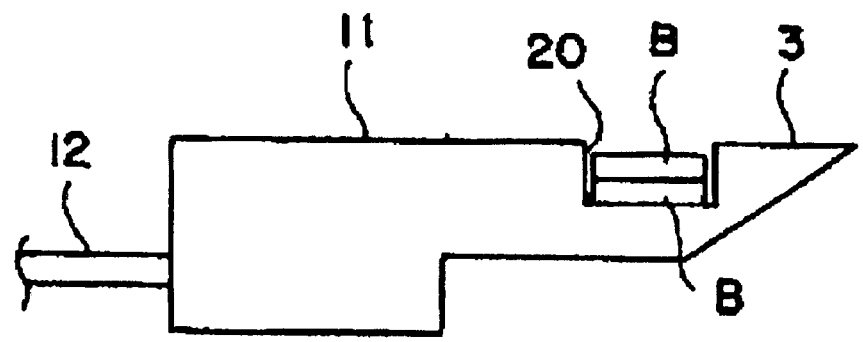
Figures 3, 4, 5, 6, 7:
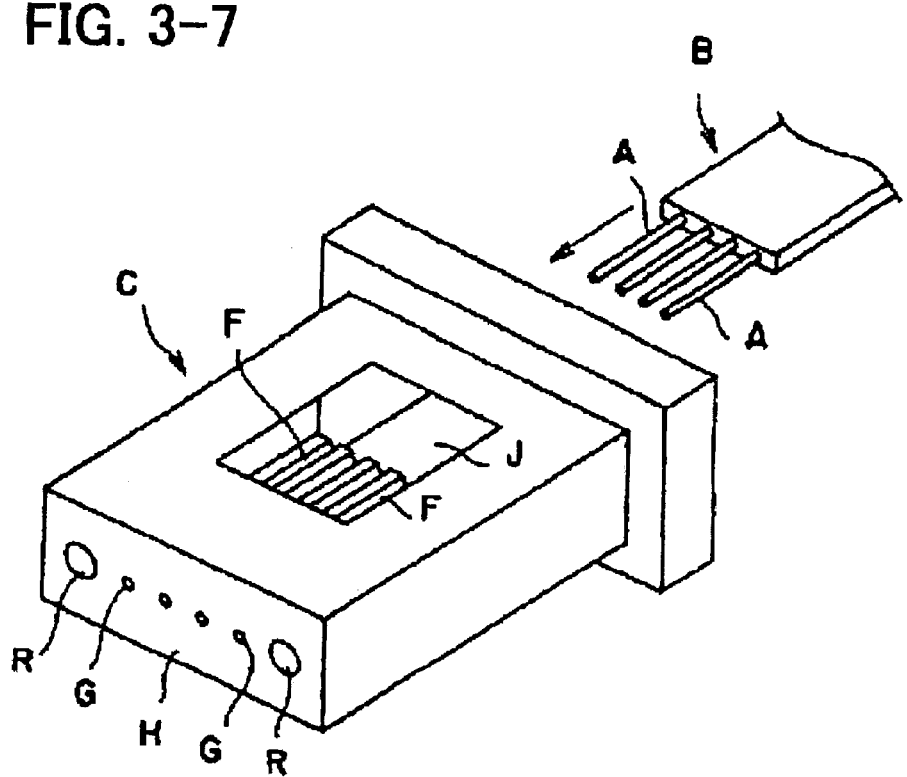
Figures 3, 4, 5, 6, 7, 8, 8A:
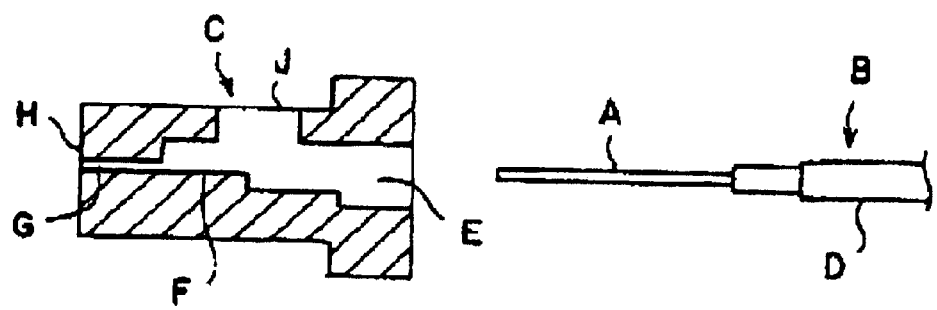
Figures 3, 4, 5, 6, 7, 8, 8B:
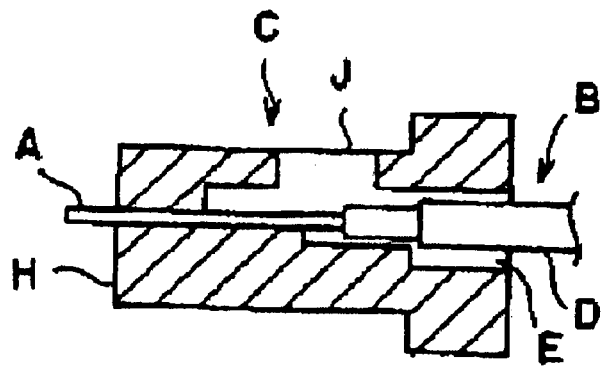
Figures 3, 4, 5, 6, 7, 8, 8C:
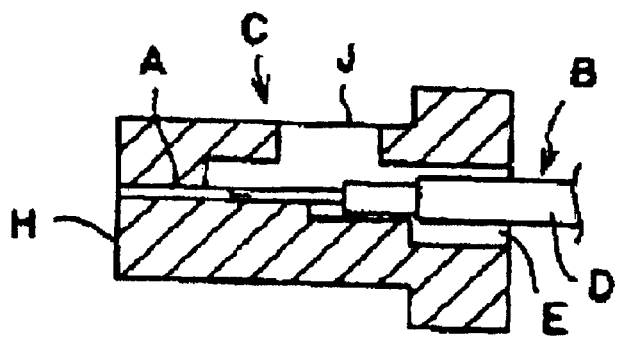
Figures 3, 4, 5, 6, 7, 8, 8D:
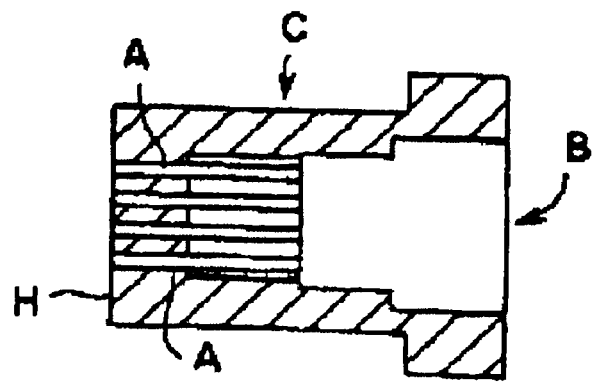
Figures 3, 4, 5, 6, 7, 8, 9, 9A:
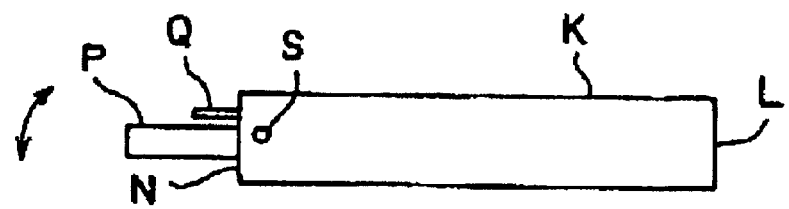
Figures 3, 4, 5, 6, 7, 8, 9, 9B:
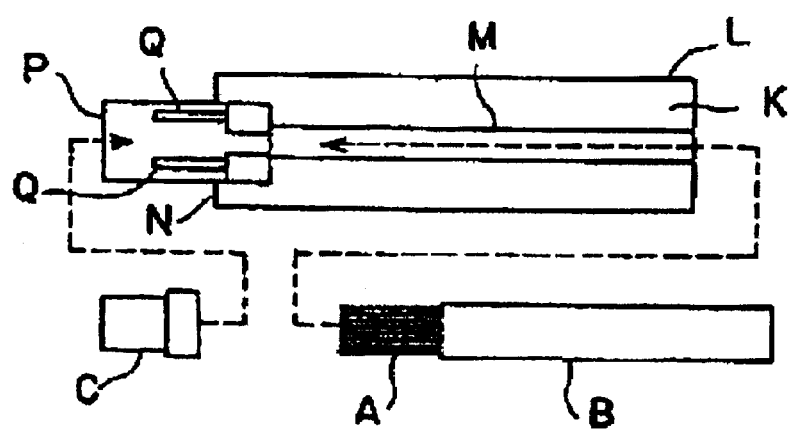
Figures 3, 4, 5, 6, 7, 8, 9, 10:
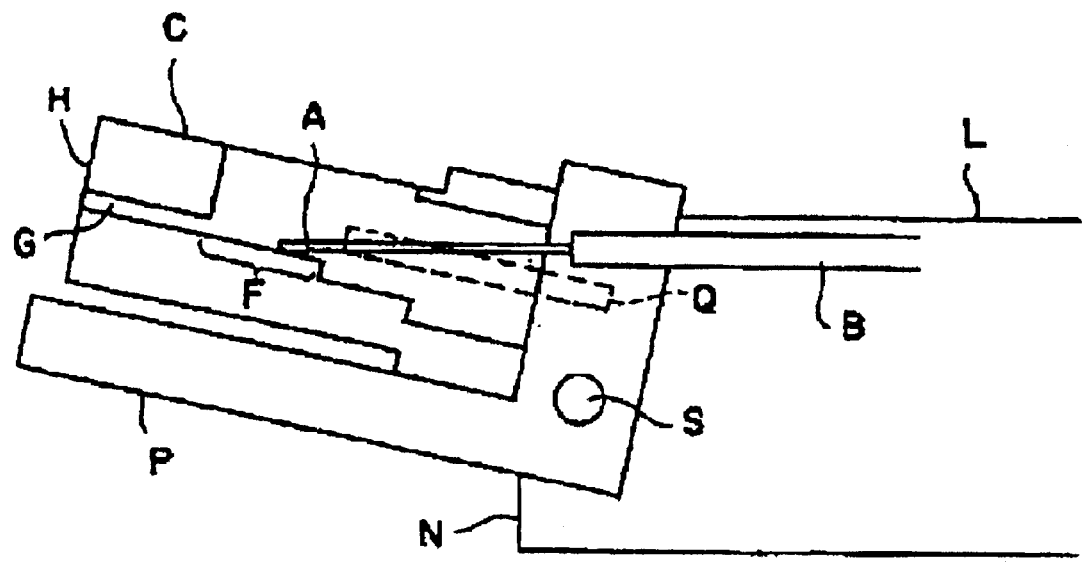
Figures 3, 4, 5, 6, 7, 8, 9, 10, 11:
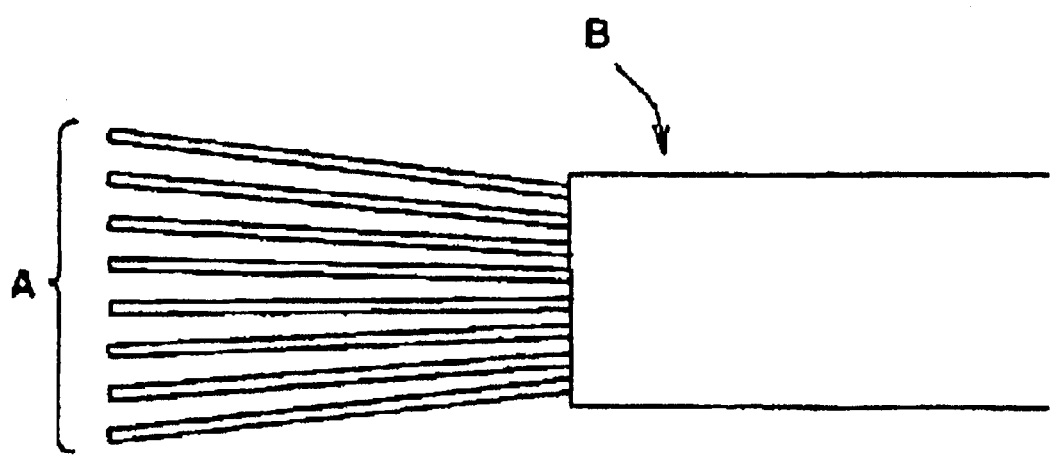
Figures 3, 4, 5, 6, 7, 8, 9, 10, 11, 12:
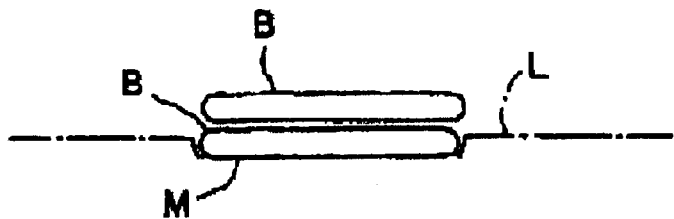
Figures 3, 4, 5, 6, 7, 8, 9, 10, 11, 12, 13, 13A:
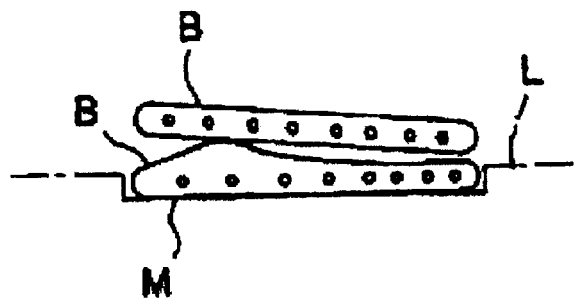
Figures 3, 4, 5, 6, 7, 8, 9, 10, 11, 12, 13, 13B:
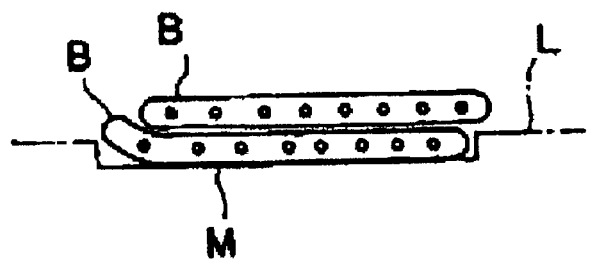

For example, as shown in FIG. 2-4, the curvature radius r5 of bends in the optical fibers 2*b*5 inserted into the fifth-step fiber inserting holes 3N5 corresponds to the above-mentioned curvature radius. Further, the distance D5 between the fiber inserting side ends of the fifth-step fiber inserting holes 3N5 and exposed fiber side end face of the tape members 2*c*5 of the corresponding optical fibers 2*b*5 corresponds to the aforementioned distance D. Furthermore, the vertical misaligmnent G5 between the central axis of a fifth-step fiber inserting hole 3N5 and the center of the exposed fiber side end face of the tape member 2*c*5 of the corresponding optical fiber 2*b*5 corresponds to the aforementioned misalignment G.

Accordingly, the curvature radius r5 of bends in the optical fibers 2*b*5 inserted into the fifth-step fiber inserting holes 3N5 can be expressed with the obtained distance D5, the misalignment G5 and the equation 2-5.

Likewise, distances between the optical fiber inserting side end faces of the first to fourth-step fiber inserting holes 3N1 to 3N4 and exposed fiber side ends of the tape members 2*c*1 to 2*c*4 of the corresponding optical fibers 2*b*1 to 2*b*4 can be indicated by D1 to D4. And, the misalignments between the central axes of first to fourth-step fiber inserting holes 3N1 to 3N4 and the centers of the exposed fiber side end faces of the tape members 2*c*1 to 2*c*5 of the corresponding optical fibers 2*b*1 to 2*b*4 can be given by G1 to G4. Accordingly, the curvature radii r1 to r4 of bends which occurred in the optical fibers 2*b*1 to 2*b*4 inserted into the first to fourth-step fiber inserting holes 3N1 to 3N4 can be expressed with the obtained distances D1 to D4, the misalignments G1 to G4 and the equation 1-6.

In FIG. 2-3, the vertical misalignment between the central axes of first-step fiber inserting holes 3N1 and the center of the exposed fiber side end face of the tape member 2*c*1 corresponding to optical fibers 2*b*1 inserted in the fiber inserting hole 3N1*s* is 0. Therefore, the misalignment Gk of the fibers at the step k ($2 \leq k \leq 5$) from the bottom step can be expressed by a difference d between a vertical fiber pitch and the thickness of a tape member. For example, in the present embodiment, since the vertical fiber pitch is 0.25 mm and the thickness of the tape member is 0.30 mm, the above-mentioned difference is given as d=0.05, and the misalignment Gk can be expressed by the following equation 2-6.

$$Gk = d(k-1) = 0.05(k-1) \qquad \text{EQUATION 2-6}$$

Next, other conditions of the curvature radius r of a bend will be described below.

In general, the whole length of a ferrule is 8 mm. And, in order to assure tolerance against the bends of the whole optical connector after completion of inserting of the fiber tape conductors 2*a*1 to 2*a*5, the tape members 2*c*1 to 2*c*5 have to be positioned at least in the ferrule 1. Therefore, when the distance (tape-peeled end distance) between exposed fiber side end faces of the tape members 2*c*1 to 2*c*5 and the opening end of the slot 8 is indicated by S, S is preferably at least 0.5 mm.

Seen from the above-mentioned equation 2-6, the longer the distances D1 to D5 are, the larger the curvature radii r1 to r5 become, which are convenient for the bends. However, in view of the tolerance against the bends of the whole optical connector, there are upper limits of the distances D1 to D5 based on the distances S.

In addition, in order to suppress degradation of optical characteristics due to shrinking of a molded form in molding a ferrule, shrinking and swelling of an optical connector per se caused by temperature change, moisture taking after the optical fiber tape conductors 2*a*1 to 2*a*5 are inserted therein or the like, the distance T (hereinafter referred to as a "window distance") from the first side face 5 (contact side face) to the window 7 along the axis of the fiber inserting holes is preferably at least 0.2 mm.

The lengths L1 to L5 of the respective guide grooves 10N1 to 10N5 along the axis of the fiber inserting holes are required to be at least 0.3 mm in view of workability of inserting optical fibers.

The above-described requirements are summarized below:

(1) Curvature radii of bends of optical fibers 2*b*1 to 2*b*5: r1 to r5 $\geq$ 30 mm;

(2) Window distance of the window 7: T $\geq$ 2.0 mm (3) Peeled tape side distance of the tape members 2*c*1 to 2*c*5 in the ferrule: S $\geq$ 0.5 mm;

(4) Length of the respective guide grooves: L1 to L5 $\geq$ 0.3 mm.

Changing the following parameters (A) and (B), values of the following parameters (A) and (B) are determined so as to satisfy all the requirements.

(A) Lengths of the respective guide grooves L1 to L5

(B) Step k of the first to fifth steps, of which misalignment Gk is set at 0

The ferrule 1 in FIG. 2-3 mentioned above is configured with the parameter (B): k=1 or the first-step misalignment: G1=0. On the other hand, the ferrule 1A in FIG. 2-5 is configured with the parameter (B): k=2 or the second-step misalignment: G2=0.

The ferrule 1B in FIG. 2-6 is configured with the parameter (B): k=3 or the third-step misalignment: G3=0.

The configuration of the ferrule 1A shown in FIG. 2-5 is different from that of the ferrule 1 in the position of the slot 8. Specifically, as shown in FIGS. 2-7A and 2-7B, the vertical position of the slot 8*a* of the ferrule 1A is 0.05 mm shifted down towards the first step compared with the position of the slot 8 of the ferrule 1 shown in FIG. 2-3 in which the first-step misalignment is 0.

The above-mentioned 0.05 mm corresponds to a difference between the vertical fiber pitch and the thickness of a tape member. In other words, since the first-step misalignment G1 is set at 0 in the ferrule 1 shown in FIG. 2-3, the vertical position of the slot 8 is also set appropriately so as to satisfy the misalignment: G1=0. Besides, there is found misalignments: Gk=d(k−1)=0.05(k−1) in the $k^{th}$ step ($2 \leq k \leq 5$).

In order to have the second-step misalignment: G2=0 in the ferrule 1A shown in FIG. 2-5, the optical fiber tape conductors 2a1 to 2a5 for the ferrule 1 shown in FIG. 2-3 have to be shifted towards the first step side or the third step side by 0.05 mm which is the second-step misalignment: G2=0.05(2−1)=0.05 mm found in the ferrule 1.

If the optical fiber tape conductors 2a1 to 2a5 are shifted to the third step side, the third or later-step misalignments will be further increased, which is considered not appropriate. Accordingly, the vertical direction of the slot 8a in the ferrule 1A shown in FIG. 2-5 is 0.05 mm shifted to the first step as compared to the vertical position of the slot 8 in the ferrule 1 shown in FIG. 2-3.

Likewise, the vertical position of the slot 8b in the ferrule 1B shown in FIG. 2-6 is shifted to the first step by 0.10 mm (corresponding to the third-step misalignment G3), compared to the vertical position of the slot 8 in the ferrule 1 shown in FIG. 2-3.

Here, in the configuration of the ferrule 1 shown in FIG. 2-3 (the first-step misalignment: G1=0), misalignments G0 to G5, distances D1 to D5, window distance T, peeled tape side distance S, distances (bend starting distances) U from the first side face 5 to the bend starting positions of the optical fibers 2b1 to 2b5 and curvature radii r1 to r5, obtained for the respective first to fifth steps when the lengths L1 to L5 of the parameter (A) are set at least 0.8 mm are shown in the table 2-1.

TABLE 2-1

L1~L5 ≧ 0.8 mm/first-step misalignment G1 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.20 | D5 = 5.5 | 2.0 | 0.5 | r5 = 30.6 | >30 |
| 4 | G4 = 0.15 | D4 = 4.7 | 2.8 | 0.5 | r4 = 29.8 | <30 |
| 3 | G3 = 0.10 | D3 = 3.9 | 3.6 | 0.5 | r3 = 30.8 | >30 |
| 2 | G2 = 0.05 | D2 = 3.1 | 4.4 | 0.5 | r2 = 38.9 | >30 |
| 1 | G1 = 0.00 | D1 = 2.3 | 5.2 | 0.5 | r1 = ∞ | >30 |

In addition, in the configuration of the ferrule 1A shown in FIG. 2-5 (the second-step misalignment: G2=0), misalignments G1 to G5, distances D1 to D5, window distance T, peeled tape side distance S, distances (bend starting distances) U from the first side face 5 to the bend starting positions of the optical fibers 2b1 to 2b5 and curvature radii r1 to r5, obtained for the respective first to fifth steps when the lengths L1 to L5 of the parameter (A) are set at least 0.8 mm are shown in the table 2-2.

TABLE 2-2

L1~L5 ≧ 0.8 mm/second-step misalignment G2 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.15 | D5 = 5.5 | 2.0 | 0.5 | r5 = 40.9 | >30 |
| 4 | G4 = 0.10 | D4 = 4.7 | 2.8 | 0.5 | r4 = 44.8 | >30 |
| 3 | G3 = 0.05 | D3 = 3.9 | 3.6 | 0.5 | r3 = 61.6 | >30 |
| 2 | G2 = 0.00 | D2 = 3.1 | 4.4 | 0.5 | r2 = ∞ | >30 |
| 1 | G1 = 0.05 | D1 = 1.5 | 6.0 | 0.5 | r1 = 9.1 | <30 |

Seen from the tables 2-1 an 2-2, it is impossible to satisfy the curvature radii r1 to r5≧30 mm for all the steps in both of the ferrule 1 and ferrule 1A. Here, considering that the curvature radii: r1 to r5≧30 mm can not be satisfied in the ferrule 1 nor ferrule 1A, it is obvious that the curvature radii: r1 to r5 ≧30 mm can not be satisfied also in the ferrule 1B. Therefore, a table of the ferrule 1B is omitted.

Next, in the configuration of the ferrule 1 shown in FIG. 2-3 (the first-step misalignment: G1=0), misaligmnents G1 to G5, distances D1 to D5, window distance T, peeled tape side distance S, bend starting distances U and curvature radii r1 to r5, obtained for the respective first to fifth steps when the lengths L1 to L5 of the parameter (A) are set at 0.7 mm are shown in the table 2-3.

TABLE 2-3

L1~L5 = 0.7 mm/first-step misalignment G1 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.20 | D5 = 5.5 | 2.0 | 0.5 | r5 = 30.6 | >30 |
| 4 | G4 = 0.15 | D4 = 4.8 | 2.7 | 0.5 | r4 = 31.1 | >30 |
| 3 | G3 = 0.10 | D3 = 4.1 | 3.4 | 0.5 | r3 = 34.1 | >30 |
| 2 | G2 = 0.05 | D2 = 3.4 | 4.1 | 0.5 | r2 = 46.9 | >30 |
| 1 | G1 = 0.00 | D1 = 2.7 | 4.8 | 0.5 | r1 = ∞ | >30 |

Then, in the configuration of the ferrule 1A shown in FIG. 2-5 (the second-step misalignment: G2=0), misalignments G1 to G5, distances D1 to D5, window distance T, peeled tape side distance S, bend starting distances U and curvature radii r1 to r5, obtained for the respective first to fifth steps when the lengths L1 to L5 of the parameter (A) are set at 0.7 mm are shown in the table 2-4.

TABLE 2-4

L1~L5 = 0.7 mm/second-step misalignment G2 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.15 | D5 = 5.5 | 2.0 | 0.5 | r5 = 40.9 | >30 |
| 4 | G4 = 0.10 | D4 = 4.8 | 2.7 | 0.5 | r4 = 46.7 | >30 |
| 3 | G3 = 0.05 | D3 = 4.1 | 3.4 | 0.5 | r3 = 68.1 | >30 |
| 2 | G2 = 0.00 | D2 = 3.4 | 4.1 | 0.5 | r2 = ∞ | >30 |
| 1 | G1 = 0.05 | D1 = 2.0 | 5.5 | 0.5 | r1 = 16.2 | <30 |

Seen from the table 2-3, if in the ferrule 1 where the first-step misalignment G1 is 0, the lengths L1 to L5 of the respective guide grooves 10N1 to 10N5 are set at 0.7 mm, the curvature radii: r1 to r5≧30 mm can be satisfied for all the steps and the other requirements can be also satisfied.

Further, seen from the table 2-4, in the ferrule 1A where the second-step misalignment G2 is 0, the curvature radii: r1 to r5≧30 mm can not be satisfied for any of the steps. Furthermore, since, as shown in FIG. 2-4, the first-step curvature radius r1 is much smaller than 30 mm, it is clear that the curvature radii: r1 to r5≧30 mm can not be satisfied for the ferrule 1B. Therefore, a table of the ferrule 1B is omitted.

Next, in the configuration of the ferrule 1 shown in FIG. 2-3 (the first-step misalignment: G1=0), misalignments G1 to G5, distances D1 to D5, window distance T, peeled tape side distance S, bend starting distances U and curvature radii r1 to r5, obtained for the respective first to fifth steps when the lengths L1 to L5 of the parameter (A) are set at 0.5 mm are shown in the table 2-5.

TABLE 2-5

L1~L5 = 0.5 mm/first-step misalignment G1 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.20 | D5 = 5.5 | 2.0 | 0.5 | r5 = 30.6 | >30 |
| 4 | G4 = 0.15 | D4 = 5.0 | 2.5 | 0.5 | r4 = 33.8 | >30 |
| 3 | G3 = 0.10 | D3 = 4.5 | 3.0 | 0.5 | r3 = 41.0 | >30 |
| 2 | G2 = 0.05 | D2 = 4.0 | 3.5 | 0.5 | r2 = 64.8 | >30 |
| 1 | G1 = 0.00 | D1 = 3.5 | 4.0 | 0.5 | r1 = ∞ | >30 |

Further, in the configuration of the ferrule 1A shown in FIG. 2-5 (the second-step misalignment: G2=0), misalignments G1 to G5, distances D1 to D5, window distance T, peeled tape side distance S, bend starting distances U and curvature radii r1 to r5, obtained for the respective first to fifth steps when the lengths L1 to L5 of the parameter (A) are set at 0.5 mm are shown in the table 2-6.

TABLE 2-6

L1~L5 = 0.5 mm/second-step misalignment G2 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.15 | D5 = 5.3 | 2.0 | 0.7 | r5 = 37.9 | >30 |
| 4 | G4 = 0.10 | D4 = 4.8 | 2.5 | 0.7 | r4 = 46.7 | >30 |
| 3 | G3 = 0.05 | D3 = 4.3 | 3.0 | 0.7 | r3 = 74.9 | >30 |
| 2 | G2 = 0.00 | D2 = 3.8 | 3.5 | 0.7 | r2 = ∞ | >30 |
| 1 | G1 = 0.05 | D1 = 2.8 | 4.5 | 0.7 | r1 = 31.8 | >30 |

Furthermore, in the configuration of the ferrule 1B shown in FIG. 2-6 (the third-step misalignment: G3=0), misalignments G1 to G5, distances D1 to D5, window distance T, peeled tape side distance S, bend starting distances U and curvature radii r1 to r5, obtained for the respective first to fifth steps when the lengths L1 to L5 of the parameter (A) are set at 0.5 mm are shown in the table 2-7.

TABLE 2-7

L1~L5 = 0.5 mm/third-step misalignment G3 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.10 | D5 = 5.5 | 2.0 | 0.5 | r5 = 61.3 | >30 |
| 4 | G4 = 0.05 | D4 = 5.0 | 2.5 | 0.5 | r4 = 101.3 | >30 |
| 3 | G3 = 0.00 | D3 = 4.5 | 3.0 | 0.5 | r3 = ∞ | >30 |
| 2 | G2 = 0.05 | D2 = 3.5 | 4.0 | 0.5 | r2 = 49.6 | >30 |
| 1 | G1 = 0.10 | D1 = 2.5 | 5.0 | 0.5 | r1 = 12.7 | <30 |

Seen from the table 2-5, if in the ferrule 1 where the first-step misalignment G1 is 0, the lengths L1 to L5 of the respective guide grooves 10N1 to 10N5 are set at 0.5 mm, the curvature radii: r1 to r5≧30 mm can be satisfied for all the steps and the other requirements can be also satisfied.

Seen from the table 2-6, if also in the ferrule 1A where the second-step misalignment G2 is 0, the lengths L1 to L5 of the respective guide grooves 10N1 to 10N5 are set at 0.5 mm, the curvature radii: r1 to r5≧30 mm can be satisfied for all the steps and the other requirements can be also satisfied.

Particularly, when the lengths L1 to L5 of the respective guide grooves 10N1 to 10N5 in the ferrule 1A are set at 0.5 mm, the peeled tape side distance S, in other words, distances between the exposed-fiber-side end faces of the taper members 2c1 to 2c5 and the opening end of the slot 8a can be set longer than the minimum value of 0.5 mm, thereby obtaining more preferable results.

In addition, when the lengths L1 to L5 of the respective guide grooves 10N1 to 10N5 are set shorter than 0.5 mm, it is possible, in producing a ferrule 1 with the use of a die, to assure enough lengths to hold molding pins for forming fiber inserting holes 3 thereby preferably improving molding accuracy of the fiber inserting holes 3 in the ferrule 1.

Further, seen from the table 2-7, in the ferrule 1B where the third-step misalignment G3 is 0, the curvature radii: r1 to r5≧30 mm can not be satisfied for all the steps.

Next, in the configuration of the ferrule 1 shown in FIG. 2-3 (the first-step misalignment: G1=0), misalignments G1 to G5, distances D1 to D5, window distance T, peeled tape side distance S, bend starting distances U and curvature radii r1 to r5, obtained for the respective first to fifth steps when the lengths L1 to L5 of the parameter (A) are set at a minimum of 0.3 mm are shown in the table 2-8.

TABLE 2-8

L1~L5 = 0.3 mm/first-step misalignment G1= 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.20 | D5 = 5.5 | 2.0 | 0.5 | r5 = 30.6 | >30 |
| 4 | G4 = 0.15 | D4 = 5.2 | 2.3 | 0.5 | r4 = 36.5 | >30 |
| 3 | G3 = 0.10 | D3 = 4.9 | 2.6 | 0.5 | r3 = 48.7 | >30 |
| 2 | G2 = 0.05 | D2 = 4.6 | 2.9 | 0.5 | r2 = 85.8 | >30 |
| 1 | G1 = 0.00 | D1 = 4.3 | 3.2 | 0.5 | r1 = ∞ | >30 |

Further, in the configuration of the ferrule 1A shown in FIG. 2-5 (the second-step misalignment: G2=0), misalignments G1 to G5, distances D1 to D5, window distance T, peeled tape side distance S, bend starting distances U and curvature radii r1 to r5, obtained for the respective first to fifth steps when the lengths L1 to L5 of the parameter (A) are set at a minimum of 0.3 mm are shown in the table 2-9.

TABLE 2-9

L1~L5 = 0.3 mm/second-step misalignment G2 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.15 | D5 = 4.8 | 2.0 | 1.2 | r5 = 31.1 | >30 |
| 4 | G4 = 0.10 | D4 = 4.5 | 2.3 | 1.2 | r4 = 41.0 | >30 |
| 3 | G3 = 0.05 | D3 = 4.2 | 2.6 | 1.2 | r3 = 71.5 | >30 |
| 2 | G2 = 0.00 | D2 = 3.9 | 2.9 | 1.2 | r2 = ∞ | >30 |
| 1 | G1 = 0.05 | D1 = 3.3 | 3.5 | 1.2 | r1 = 44.1 | >30 |

Furthermore, in the configuration of the ferrule 1B shown in FIG. 2-6 (the third-step misalignment: G3=0), misalignments G1 to G5, distances D1 to D5, window distance T, peeled tape side distance S, bend starting distances U and curvature radii r1 to r5, obtained for the respective first to fifth steps when the lengths L1 to L5 of the parameter (A) are set at a minimum of 0.3 mm are shown in the table 2-10.

TABLE 2-10

L1~L5 = 0.3 mm/third-step misalignment G3 = 0

| Step | Misalignment G (mm) | Distance D (mm) | Bend Starting Distance U (mm) | Peeled Tape Side Distance S (mm) | Curvature radius r (mm) | |
|---|---|---|---|---|---|---|
| 5 | G5 = 0.10 | D5 = 5.4 | 2.0 | 0.6 | r5 = 59.1 | >30 |
| 4 | G4 = 0.05 | D4 = 5.1 | 2.3 | 0.6 | r4 = 105.4 | >30 |
| 3 | G3 = 0.00 | D3 = 4.8 | 2.6 | 0.6 | r3 = ∞ | >30 |
| 2 | G2 = 0.05 | D2 = 4.2 | 3.2 | 0.6 | r2 = 71.5 | >30 |
| 1 | G1 = 0.10 | D1 = 3.9 | 3.5 | 0.6 | r1 = 30.8 | >30 |

Seen from the table 2-8, if in the ferrule 1 where the first-step misalignment G1 is 0, the lengths L1 to L5 of the respective guide grooves 10N1 to 10N5 are set at 0.3 mm, the curvature radii: r1 to r5≧30 mm can be satisfied for all the steps and the other requirements can be also satisfied.

Seen from the table 2-9, if in the ferrule 1A where the second-step misalignment G2 is 0, the lengths L1 to L5 of the respective guide grooves 10N1 to 10N5 are set at 0.3 mm, the curvature radii: r1 to r5≧30 mm can be satisfied for all the steps and the other requirements can be also satisfied.

Particularly, when the lengths L1 to L5 of the respective guide grooves 10N1 to 10N5 in the ferrule 1A are set at 0.3 mm, the curvature radii r1 to r5 can be set larger than those for the other cases (accordingly, the ill effects of bends can be reduced). Further, the peeled tape side distance S, in other words, distances between the exposed-fiber-side end faces of the taper members 2c1 to 2c5 and the opening end of the slot 8a can be set at a value twice longer than the minimum value of 0.5 mm, thereby obtaining more preferable results.

Seen from the table 2-10, if also in the ferrule 1B where the third-step misalignment G3 is 0, the lengths L1 to L5 of the respective guide grooves 10N1 to 10N5 are set at 0.3 mm, the curvature radii: r1 to r5≧30 mm can be satisfied for all the steps and the other requirements can be also satisfied.

Further, since the first-step curvature radius r1 is approximately 30 mm shown in the table 2-10, it is clear that the first-step curvature radius r1 can be set smaller in a ferrule in which the fourth or later-step misalignment G4, G5 is 0. Therefore, tables of ferrules of which the fourth or later-step misalignment G4, G5 is 0 are omitted.

As described above, according to the present embodiment, if the lengths L1 to L5 of the respective guide grooves 10N1 to 10N5 of the ferrule 1 are set in a range of 0.3 mm to 0.7 mm (more than 0.3 mm and less than 0.7 mm), it is possible to produce a ferrule 1 which satisfies all the above-mentioned requirements (1) to (4).

Particularly, it is preferable that the ferrule 1A, after having the optical fiber tape conductors 2a1 to 2a5 inserted therein, is configured such that the slot 8a is positioned in such a manner that a misalignment between the central axes of the second-step fiber inserting holes 3N2 and the center of an exposed fiber side end face of the tape member 2c2 of the corresponding optical fibers 2b2 is set at 0 and the lengths L1 to L5 of the respective guide grooves 10N1 to 10N5 are set at 0.3 mm (refer to FIG. 2-8), thereby assuring a longer peeled tape side distance from the slot to the inside of the ferrule as well as a larger curvature radius of the bends.

Here, in the above-mentioned embodiment, it has been described that bends of the optical fibers 2b1 to 2b5 become maximum at the optical fiber inserting side end portion of the fiber inserting holes 3N1 to 3N5. However, these are for simplification of the calculations but not for limiting the present invention. For example, a ferrule 1D as shown in FIG. 2-9 is provided with guide holes 30N1 to 30N5 which extend coaxially in communication with the fiber inserting holes 3N1 to 3N5, instead of the guide grooves 10N1 to 10N5.

Each of these guide holes 30N1 to 30N5 has a diameter longer than that of each of the fiber inserting holes 3N1 to 3N5. Therefore, in a thus configured ferrule ID, bends of the optical fibers 2b1 to 2b5 are likely to be reduced.

Also in the configuration shown in FIG. 2-9, the same effects can be obtained if the lengths of the guide holes 30N1 to 30N5 along the axes thereof are set in a range of 0.3 mm to 0.7 mm as described in the present embodiment.

Further, in the present embodiment, the guide grooves 10N1 to 10N5 are formed to be coaxially in communication with the lower edges of the fiber inserting holes 3 of the respective steps, or each to have a cross section of approximately semicircular shape. However, this is not for limiting the present invention.

In other words, the guide grooves 10N1 to 10N5 may have any configuration only if they are allowed to guide insertion of optical fibers into the fiber inserting holes 3 along the axial direction of the respective fiber inserting holes.

In the present embodiment, description has been made as to a 60-core ferrule which has 12-core fiber inserting holes aligned at each of the first to fifth steps and an optical connector which utilizes such a 60-core ferrule. However, these are not for limiting the present invention. The present invention may be applicable to any ferrule that has a plurality of fiber inserting holes arranged at plural steps and any connector which utilizes such a ferrule.

Next, an optical fiber inserting jig will now be described with reference to the drawings.

Embodiment 3-1

Description is made below about an example of the embodiment of an optical fiber inserting jig according to the present invention. This optical fiber inserting jig includes a base member 1 made of resin, which has a ferrule set stage 2 on which a ferrule C in FIG. 3-7 can be set and a fiber set stage 3 on which an optical fiber tape B shown in the same figure can be set. When the optical fiber tape B of which coating if peeled off at the end to have optical fibers A exposed is set on the fiber set stage 3 and slid toward the ferrule set stage 2, the optical fibers A are inserted into respective fiber inserting holes G (in FIG. 3-7) of the ferrule set on the ferrule set stage 2.

As shown in FIG. 3-1, the above-mentioned fiber set stage 3 is integrally formed with a sliding member 11 which slides to the direction of the arrow a-b in FIG. 3-1 in a stage setting space 10 formed by providing a recess in the upper surface of the base member 1. Specifically, two parallel support axes 12 are allowed to pass through the sliding member 11, and both ends of each of the support axes 12 are fixed onto opposed inner walls of the stage setting space 10 to support the sliding member 11 so that the sliding member 11 can slide in the direction of the arrow as well as the fiber set stage 3. Further, there is provided a control pin 14 between the support axes 12 and in parallel with the support axes 12, and an end of the control pin is allowed to pass through a side wall 15 of the stage setting space 10 to the outside of the base member 1. Then, this protruding end is provided with a knob 16 on. When the knob 16 is pushed to the axial direction of the control pin 14, the sliding member 11 is guided by the support axes 12 to slide to the direction of the arrow a, and the fiber set stage 3 is moved to the same direction. Meanwhile, when the knob 16 is pulled to the axial direction of the control pin 14, the sliding member 11 is guided by the support axes 12 to slide to the direction of the arrow b, and the fiber set stage 3 is moved to the same direction.

As shown in FIG. 3-1, the above-mentioned fiber set stage 3 has a guide groove 20 formed running the length of the fiber set stage 3, which groove 20 is little wider than the optical fiber tape B, and the optical fiber tape B can be set in the groove 20. The sliding member 11 has a holding portion 21 which can hold the optical fiber tape B set in the guide groove 20 by covering the optical fiber tape B. More specifically, a fitting axis 23 is bridged between two protruding brackets 22 which are provided each at an end of the sliding member 11 so as to be longitudinally opposed to each other. The holding portion 21 is mounted on the fitting axis 23 so as to be turnable along the direction of the arrow c-d. Therefore, the holding portion 21 is turned to the direction d in the figure before the optical fiber tape B is set in the guide groove 20 on the fiber set stage 3, and when the holding portion 21 is turned to the direction c the optical fiber tape B is held between the guide groove 20 and the holding portion 21. The holding portion 21 is allowed to slide to the axial direction of the fitting axis 23, and can hold any longitudinal position of the optical fiber tape B set in the guide groove 21.

As shown in FIG. 3-1, the ferrule set stage 2 is formed to be a resin block which has three side walls 30 provided on the upper surface in such a manner that the ferrule C can be fit (set) in the side walls 30. The front one of the side walls 30 has a gap 31 formed so as to prevent interference with the optical fiber protruding from the contact side face H of the ferrule shown in FIG. 3-8B. And, the other side walls 30 has gaps 32 formed so as to prevent interference with the collar S of the ferrule C.

As shown in FIG. 3-1, the ferrule set stage 2 is provided at a longitudinal end of the base member 1 so as to be turnable along the arrow e-f in the figure. Specifically, a fixing pin (not shown) is allowed to pass through the back end of the ferrule set stage 2 in parallel with the alignment direction of the fiber alignment grooves F (in FIG. 3-7) of the ferrule C set in the stage 2, and both ends of the fixing pin are fixed to the base member 1 in such a manner that the stage 2 is turnable around the fixing pin in the direction of the arrow e-f.

As shown in FIG. 3-1, a fiber alignment portion 40 is provided at the backside of the above-mentioned ferrule set stage 2 (the fiber set stage 3 side). This fiber alignment portion 40 has a plurality of dividing plates 41 spaced, in which at least 2 fiber inserting grooves 42 are formed at a given pitch so that the optical fibers A are aligned by being inserted into the inserting grooves 42 which is shown in FIG. 3-2. The plurality of dividing plates 41 are spaced at a pitch larger than a diameter of each of the optical fibers A to be inserted into the fiber inserting grooves 42 and the pitch between the centers of the adjacent optical fiber inserting grooves 42 is the same as the alignment pitch of the optical fibers A. If the alignment pitch of the dividing plates 41 (=the width of each of the optical fiber inserting grooves 42) is too large, alignment of the optical fibers A will be degradated. Therefore, the alignment pitch of the dividing plates 42 is preferably between or equal to 0.130 and 0.145 mm.

As shown in FIG. 3-3, each of the dividing plate 41 of the aforementioned fiber alignment portion 40 tapers down from its roots to the upper edges 44 of the dividing plate 41. Therefore, a slot 43 of the optical fiber inserting groove 42 becomes wider to the outside, which facilitates insertion of an optical fiber A into the groove 42.

As shown in FIG. 3-2, guide pin grooves 50 are provided one at each side of the above-mentioned fiber alignment portion 40 so as to receive guide pins U protruding from the side face T of the ferrule C set on the ferrule set stage 2 (the side face T is opposite to the contact side face H). The ferrule C can be positioned by inserting the guide pins U into the guide pin grooves 50. Besides, when the guide pins U of the ferrule C are inserted in the guide pin grooves 50, the side face T of the ferrule C is got in contact with the fiber alignment portion 40 tightly with no space formed between them. Therefore, it is not necessary to prepare an exposed optical fiber A of the optical fiber tape B longer than necessary, and it becomes easy to insert the optical fiber A into the optical fiber inserting groove 42. Furthermore, inserting into the fiber inserting hole G of the ferrule C becomes facilitated. More specifically, if the guide pins 50 are not provided, the guide pins U protruding from the ferrule side face T are interfered with the fiber alignment portion A, which causes a space corresponding to the protrusive length of the guide pins U between the ferrule side face T and the fiber alignment portion 40. Accordingly, in order to assure a given insertion length, it is required to make the exposed optical fiber A longer. However, when the exposed optical fiber A is longer, the width of the optical fibers A shown in FIG. 3-11 becomes significantly increased, which makes it extremely difficult to insert them into the optical fiber inserting grooves 42.

(Example of How to Use 3-1

Inserting of an optical fiber tape shown in FIG. 3-7 into a ferrule shown in the same figure with the use of an optical fiber inserting jig of the present invention having the structure as above is carried out in the following manner.

(1) After the holding portion 21 shown in FIG. 3-1 is turned in the direction of the arrow d, an optical fiber tape B is set in a guide groove 20 on the fiber set stage 3. This is followed by the holding portion 21 which is turned in the direction of the arrow c to fix the optical fiber tape on the stage 3. Here, coating of an end of the optical fiber tape B is removed off in advance to make the optical fibers A exposed by a given length.

(2) A ferrule C is set downward on the ferrule set stage 3 shown in FIG. 3-1. Then, the guide pins U protruding from the side face T of the ferrule C are inserted into the guide pins 50 in FIG. 3-2 to position the ferrule C, and the ferrule side face T and the fiber alignment portion 40 abut on each other with no space formed therebetween. Here, either of the optical fiber tape B and the ferrule C may be set first.

(3) The fiber tape B is slid to the fiber alignment portion 40 shown in FIG. 3-1 along the guide groove 20 to insert the optical fibers A into the optical fiber inserting grooves 42 of the fiber alignment portion 40. Specifically, while ends of the optical fibers A are lifted above, the optical fiber tape B is slid to the fiber alignment portion 40 to move the optical fibers A above the optical fiber inserting grooves 42 (FIG. 3-3). Then, optical fibers A are inserted through the slots 43 of the optical fiber inserting grooves 42 shown in FIG. 3-3 into the grooves 42. Thereby, the optical fibers A are aligned at a predetermined pitch (this pitch is given by the pitch of the optical fibers A before being widened if the optical fibers A are widened by removing coatings of the optical fibers A).

(4) The optical fiber tape B is slid to the ferrule set stage 2 along the guide groove 30 and the optical fibers A are inserted from the slot E of the ferrule C into the ferrule C further onto the respective fiber alignment grooves F (FIG. 3-7). At this time, the optical fibers A are aligned at the predetermined pitch by the fiber alignment portion 40, which enables the optical fibers A to be put on the fiber alignment grooves F easily and for a short time.

(5) The optical fiber tape B is slid along the guide groove 20 further to the ferrule set stage 2. Then, the optical fibers A on the fiber alignment grooves F are guided by the fiber alignment grooves F to pass through the fiber inserting holes G provided in communication with the fiber alignment grooves F.

(6) The optical fiber tape B and the ferrule C are raised upward to be removed from the respective stages 2 and 3.

Example of How to Use 3-2

Insertion of an optical fiber tape into a multi-core ferrule which has fiber inserting holes formed at 2 or more steps.

(1) The steps (1) to (5) of the above-mentioned example of how to use 3-1 are performed to insert optical fibers to the first-step fiber inserting holes of the ferrule.

(2) The holding portion 21 which holds the already inserted optical fiber tape B is turned in the direction of the arrow d to release the holding.

(3) As shown in FIG. 3-5A, the optical fiber tape B is raised little up to be isolated from the guide groove 20.

(4) The knob 16 shown in FIG. 3-1 is pulled in the direction of the arrow b to move the fiber set stage 3 in the same direction as shown in FIG. 3-5B.

(5) After isolating the optical fiber tape B from the groove 20, the knob shown in FIG. 3-1 is pushed in the direction of the arrow a to replace the fiber set stage 3 as it was. Then, as shown in FIG. 3-5C, the previously inserted optical fiber tape B is moved downwardly under the fiber set stage 3. Here, the central axis of the guide groove 20 of the fiber set stage 3 and the central axis of the ferrule set stage 2 are positioned to be identical to each other when the sliding member 11 shown in FIG. 3-1 is slid in the direction of the arrow a to abut to the inside of the side wall 13 of the stage setting space 1. In addition, since the bottom surface of the fiber set stage 3 is tapered, the fiber set stage 3 is moved in the direction of the arrow a in FIG. 3-1, the optical fiber tape B is smoothly moved along the tapered bottom surface under the stage 3.

(6) The steps (1) to (5) of the above-described example of how to use 3-1 are repeated optical fibers of a new optical fiber tape into fiber inserting holes of the second step from the bottom of the ferrule.

(7) Subsequently, the steps of (1) to (5) are repeated to insert optical fibers into fiber inserting holes of each step. After that, the optical fiber tape B and the ferrule are raised up to remove them from the respective stages 3 and 2.

Embodiment 3-2

For the optical fiber inserting jig shown in the above-mentioned embodiment 3-1, the ferrule C can be positioned by inserting the guide pins U which are protruding from the ferrule C set on the ferrule set stage 2 into the guide pin grooves 50. However, as shown in FIG. 3-6A, there are provided on the ferrule set stage 2 two positioning portions 60 equally spaced by the horizontal width of the ferrule C on the ferrule set stage 2 and opposed to each other so that the ferrule C may be positioned by interposing the ferrule C between the positioning portions 60. Here, the horizontal width of the ferrule C is formed with high accuracy and an error thereof is kept below 10 μm.

Therefore, the ferrule C even positioned with reference to its shape of the ferrule C as described above can assure an excellent accuracy.

The guide groove 20 on the fiber set stage 2 shown in FIG. 3-1 may be formed to be deeper so as to receive two or more superposed optical fiber tapes as shown in FIG. 3-6B. With the thus formed guide groove 20, a plurality of optical fiber tapes are inserted into multi-core ferrule by superposing another optical fiber tape B on the optical fiber tape previously inserted in the ferrule. In this case, the fiber set stage 3 is not required to slide.

As described above, according to an optical connector ferrule, an optical connector and an optical connector assembling method of the present invention, there is provided a contact portion formed spaced by a predetermined distance from opening ends opposed to fiber inserting ends of the fiber inserting holes along the axial direction of the fiber inserting holes, the contact portion being brought into contact with exposed fiber side ends of tape members of the optical fiber tape conductors when the optical fibers of the optical fiber tape conductors are inserted in the respective fiber inserting holes, thereby allowing the predetermined distance of the contact portion to be determined a value far from effects of bends of the optical fibers (the curvature radii are 30 mm or longer).

Therefore, the bends of the optical fibers can be reduced to be a minimum so as to have little effects on the optical characteristics and intensity of the optical fibers. As a result of this reduction, degradation of the optical characteristics and intensity due to bends of the optical fibers can be prevented thereby assuring high reliability of the whole ferrule and the whole optical connector.

In addition, according to an optical connector ferrule and an optical connector of the present invention, each of guide portions formed so as to communicate with fiber inserting ends of corresponding fiber inserting holes arranged at plural steps has a length along the axial direction of the fiber inserting holes of between or equal to 0.3 mm and 0.7 mm. Consequently, the curvature radii of bends of the optical fibers can be determined such that the bends have little effect on the optical characteristics and intensity of the optical fibers (the curvature radii are 30 mm or longer).

Accordingly, degradation of the optical characteristics and intensity caused by bends of the optical fibers due to molding distortion, deformation by change in temperature or moisture taking or the like are suppressed thereby preventing degradation of the optical characteristics and intensity of the whole ferrule and the whole optical connector Furthermore, an optical fiber inserting jig according to the present invention includes a fiber alignment portion which has at least two optical fiber inserting groove divided by a plurality of dividing plates so as to align optical fibers by inserting the optical fibers to the respective inserting grooves. Therefore, the optical fibers can be aligned before being inserted into the ferrule, thereby assuring easy and short-time completion of insertion into the fiber inserting holes.

According to the optical fiber inserting jig of the present invention, the optical fiber inserting groove has a width between or equal to 0.130 mm and 0.145 mm. Accordingly, it is possible to obtain accurate alignment without any interference caused by inserting the optical fibers into or removing from the optical fiber inserting groove.

The optical fiber inserting jig of the present invention is provided with guide pin grooves at the both sides of the fiber alignment portion for receiving guide pins protruding from the side face of the ferrule set on the ferrule set stage. Therefore, it is not necessary to expose an optical fiber of the optical fiber tape more than necessary and there do not occur various problems caused by the optical fibers exposed longer than necessary. The problems caused by the optical fibers exposed longer than necessary are described above. Inserting of the guide pins into the guide pin grooves also enables the ferrule to be positioned. Further, when the ferrule set on the ferrule set stage is raised upward, the guide pins are removed from the guide pin grooves to reset the positioning of the ferrule, which makes it possible to replace the ferrule from the stage. Accordingly, in removing the ferrule from the stage, the ferrule needs not be moved in the inserting direction of the optical fibers, preventing the possibility of the optical fibers to be pulled out.

According to the optical fiber inserting jig of the present invention, the width of a guide pin groove is set at between or equal to 0.700 mm to 0.720 mm. This assures enough positioning accuracy without any problems caused by the guide pins inserting into or removing from the guide pin grooves.

According to the optical fiber inserting jig of the present invention, the fiber set stage can be slid in the direction perpendicular to the axial direction of the optical fiber tape set on the fiber set stage, and therefore, the optical fiber tape already inserted into the ferrule can be removed under the stage before another optical fiber tape is set on the fiber set stage. Accordingly, when a plurality of optical fiber tapes are inserted into the ferrule, a previously inserted optical fiber tape can be kept out of the way so as to smooth operation of another optical fiber tape next to be inserted, thereby improving workability.

According to the optical fiber inserting jig of the present invention, a ferrule set stage is turnable around the alignment direction of the fiber inserting holes of the ferrule set on the ferrule set stage. Therefore, it is easy to align optical fibers with a fiber alignment portion or fiber alignment grooves of the ferrule.

What is claimed is:

1. An optical connector ferrule for supporting an optical fiber tape conductor having an end of which a coating is peeled off to expose optical fibers, comprising:

a plurality of fiber inserting holes which are arranged at a plurality of steps and into which said optical fibers are inserted;

a guide portion for guiding insertion of optical fibers, formed so as to have an end communicating with a fiber inserting end of each of said fiber inserting holes, said guide portion extending along an axial direction of said fiber inserting holes; and a contact portion formed to be a predetermined distance spaced from an opening end opposed to the fiber inserting end of each of said fiber inserting holes along the axial direction of said fiber inserting holes, said contact portion being brought in contact with an exposed fiber side end of a tape member of said optical fiber tape conductor when each of said optical fibers of said optical fiber tape conductor is inserted into each of said fiber inserting holes.

2. The optical connector ferrule according to claim 1, wherein a predetermined distance from the opening end of each of said fiber inserting holes to said contact portion along the axial direction of said fiber inserting holes is determined in such a manner that when each of said optical fibers of said optical fiber tape conductor is inserted into a corresponding one of said fiber inserting holes at the respective steps, each curvature radius of r1 to rm (where m is an integer of at least 2, corresponding to the number of the steps) of bends of the optical fibers at the respective steps becomes at least a predetermined value.

3. The optical connector ferrule according to claim 2, wherein said predetermined value is 30 mm.

4. The optical connector ferrule according to claim 1, further comprising:

a first housing in which said plurality of fiber inserting holes are formed, having an opening face which includes opening ends of said plurality of fiber inserting holes; and a second housing provided extending from said first housing to the axial direction of said fiber inserting holes, having a slot, opposed to said opening face, for inserting said optical fiber tape conductor, wherein said contact portion comprises protrusive portions stepped up inwardly from faced slot inner edges in said second housing.

5. The optical connector ferrule according to claim 4, wherein a distance between said protrusive portions stepped up inwardly from the faced slot inner edges is shorter than a width of the exposed fiber side end of the tape member of said optical fiber tape conductor.

6. An optical connector comprising: an optical fiber tape conductor having an end of which a coating is peeled off to expose optical fibers; and a ferrule for supporting said optical fiber tape conductor, said ferrule comprising:

a plurality of fiber inserting holes which are arranged at a plurality of steps and into which said optical fibers are inserted;

a guide portion for guiding insertion of optical fibers, formed so as to have an end communicating with a fiber inserting end of each of said fiber inserting holes, said guide portion extending along an axial direction of said fiber inserting holes; and a contact portion formed to be a predetermined distance spaced from an opening end opposed to the fiber inserting end of each of said fiber inserting holes along the axial direction of said fiber inserting holes, said contact portion being brought in contact with an exposed fiber side end of a tape member of said optical fiber tape conductor when each of said optical fibers of said optical fiber tape conductor is inserted into a corresponding one of said fiber inserting holes.

7. An optical connector assembling method for assembling an optical connector with the use of an optical fiber tape conductor having an end of which a coating is peeled off to expose optical fibers, comprising the steps of:

preparing a ferrule which has: a plurality of fiber inserting holes which are arranged at a plurality of steps and into which said optical fibers are inserted; a guide portion for guiding insertion of optical fibers, formed so as to have an end communicating with a fiber inserting end of each of said fiber inserting holes, said guide portion extending along an axial direction of said fiber inserting holes; and a contact portion formed to be a predetermined distance spaced from an opening end opposed to the fiber inserting end of each of said fiber inserting holes along the axial direction of said fiber inserting holes; and inserting each of said optical fibers of said optical fiber tape conductor inserted into a corresponding one of said fiber inserting holes so that an exposed fiber side end of a tape member of said optical fiber tape conductor is brought in contact with said contact portion.

8. The optical connector assembling method according to claim 7, wherein a predetermined distance from the opening end of each of said fiber inserting holes to said contact portion along the axial direction of said fiber inserting holes is determined in such a manner that when each of said optical fibers of said optical fiber tape conductor is inserted into a corresponding one of said fiber inserting holes at the respective steps, each curvature radius of r1 to rm (where m is an integer of at least 2, corresponding to the number of the steps) of bends of the optical fibers at the respective steps becomes at least a predetermined value.

9. The optical connector assembling method according to claim 8, wherein said predetermined value is 30 mm.

10. An optical connector ferrule comprising:
a plurality of fiber inserting holes which are arranged at a plurality of steps and into which optical fibers are inserted; and
a guide portion for guiding insertion of optical fibers, formed so as to communicate with a fiber inserting end of each of said fiber inserting holes, said guide portion extending along an axial direction of said fiber inserting holes,
wherein a length of said guide portion along the axial direction of said fiber inserting holes is set in a range of 0.3 mm to 0.7 mm.

11. The optical connector ferrule according to claim 10, comprising a first side face having an opening face which includes opening ends of said plurality of fiber inserting holes; and a second side face provided communicating with a vertical edge of said first side face along and extending along the axial direction of said fiber inserting holes, said second side face having a window through which is injected a fiber fixing member for fixing the optical fibers inserted into said fiber inserting holes, respectively,
wherein a length from said first side face to a window formed portion in said second side face along a direction of inserting said optical fibers is set at 2.0 mm or longer.

12. The optical connector ferrule according to claim 10, wherein said optical fibers are optical fibers corresponding in number to said fiber inserting holes, being exposed by peeling off a tape member of an end of an optical fiber tape conductor coated with a tape member,
said optical connector ferrule comprising a slot, formed opposed to said first side face, for inserting a plurality of optical fiber tape conductors corresponding to said fiber inserting holes at the respective steps, and
a position of said slot is determined in such a manner that when the optical fibers of each of said optical fiber tape conductors are inserted individually into the fiber inserting holes at a desired step of the plurality of steps via said slot, a vertical misalignment between a central axis of each of said fiber inserting holes and a center of an exposed fiber side end of a corresponding one of said optical fiber tape conductors becomes 0.

13. An optical connector ferrule for supporting an optical fiber tape conductor provided with a plurality of optical fibers coated with a tape member, said optical fiber tape conductor having an end of which a coating is peeled off to expose optical fibers, comprising:
a plurality of fiber inserting holes which are arranged at a plurality of steps and into which said optical fibers are inserted;
a guide portion for guiding insertion of optical fibers, formed so as to communicate with a fiber inserting end of each of said fiber inserting holes, said guide portion extending along an axial direction of said fiber inserting holes,
wherein, a vertical misalignment between a central axis of said fiber inserting holes at each step into which when the optical fibers of said optical fiber tape conductor are inserted and a center of an exposed fiber side end in the tape member of said optical fiber tape conductor is indicated by G1 to Gn (where n is an integer of at least 2, corresponding to the number of the steps), and a distance between a connecting end of the guide portion corresponding to said each of fiber inserting holes and the exposed fiber side end in the tape member of the optical fiber tape conductor is indicated by D1 to Dn, the misalignment of G1 to Gn and the distance of D1 to Dn are used to express each curvature radius of r1 to rn of bends of the optical fiber tape conductors of the respective steps, and a length of said guide portion along the axial direction of said fiber inserting holes is determined such that the curvature radius of r1 to rn becomes at least a predetermined value.

14. The optical connector ferrule according to claim 13, wherein in addition to a requirement of the curvature radius of r1 to rn of the bends, the length of said guide portion along the axial direction of said fiber inserting holes is determined in such a manner that a misalignment of either step in misalignments of G1 to Gn is set at 0.

15. The optical connector ferrule according to claim 13, wherein said predetermined value is 30 mm.

16. The optical connector ferrule according to claim 15, having a first side face having an opening face which includes opening ends of said plurality of fiber inserting holes; and a second side face provided communicating with a vertical edge of said first side face and extending along the axial direction of said fiber inserting holes, said second side face having a window through which is injected a fiber fixing member for fixing the optical fibers inserted in said fiber inserting holes,
wherein the length of said guide portion along the axial direction of said fiber inserting holes is determined in such a manner that the curvature radius of r1 to rn of the bends is set at 30 mm or longer, a length from said first side face to a window formed portion in said second side face along a direction of inserting said optical fibers is set at 2.0 mm or longer.

17. The optical connector ferrule according to any one of claim 13, the length of said guide portion along the axial direction of said fiber inserting holes is set in a range of 0.3 mm to 0.7 mm.

18. An optical connector comprising: a ferrule; and an optical fiber tape conductor provided with a plurality of optical fibers coated with a tape member, said optical fiber tape conductor having an end of which a coating is peeled off to expose optical fibers, said ferrule comprising:
a plurality of fiber inserting holes which are arranged at a plurality of steps and into which said optical fibers are inserted;
a guide portion for guiding insertion of optical fibers, formed so as to communicate with a fiber inserting end of each of said fiber inserting holes, said guide portion extending along an axial direction of said fiber inserting holes;
a first side face having an opening face which includes opening ends of said plurality of fiber inserting holes;
a second side face provided communicating with a vertical edge of said first side face and extending along the axial direction of said fiber inserting holes, said second side face having a window through which is injected a fiber fixing member for fixing the optical fibers inserted in said fiber inserting holes; and
a slot provided at a side face opposed to said first side face, and said optical fiber tape conductor of which the optical fibers and a tape member are inserted into said ferrule through said slot, each of the optical fibers being supported by being inserted into a corresponding one of said fiber inserting holes via said guide portion, a length of said guide portion along the axial direction of said fiber inserting holes being set in a range of 0.3 mm to 0.7 mm, a length from said first side face to a window formed portion in said second side face along a direction of inserting said optical fibers is set at 2.0 mm or longer, and a distance between an exposed fiber side end face of the tape member of said optical fiber tape conductor inserted in said ferrule and an opening end faceof said slot is set at 0.5 mm or longer.

19. An optical fiber inserting jig, comprising a ferrule set stage for setting a ferrule and a fiber set stage for setting an optical fiber tape conductor, said optical fiber tape conductor, which has an edge of which a coating is peeled off to expose optical fibers, being set on said fiber set stage and slid toward said ferrule set stage, thereby allowing the optical fibers to be inserted into fiber inserting holes of the ferrule set on said ferrule set stage, wherein a fiber alignment portion for aligning the optical fibers is provided on said ferrule set stage, said fiber set stage or between said ferrule set stage and said fiber set stage, said fiber alignment portion having more than two fiber inserting grooves divided by a plurality of dividing plates and allowing the optical fibers to be aligned by inserting the optical fiber into the respective fiber inserting grooves.

20. The optical fiber inserting jig according to claim 19, wherein each of said fiber inserting grooves has a width between or equal to 0.130 mm and 0.145 mm.

21. The optical fiber inserting jig according to claim 19, wherein guide pin grooves are provided one at each side of said fiber alignment portion, for allowing guide pins protruding from a side face of the ferrule set on said ferrule set stage to be inserted into said guide pin grooves.

22. The optical fiber inserting jig according to claim 21, wherein each of said guide pin grooves has a width between or equal to 0.700 mm and 0.720 mm.

23. The optical fiber inserting jig according to any one of claim 19, wherein said fiber set stage is slidable along a direction perpendicular to an axial direction of the optical fiber tape conductor set on said fiber set stage, an optical fiber tape conductor is allowed to be set on said fiber set stage once a previously-inserted optical fiber tape conductor is taken away under said fiber set stage.

24. The optical fiber inserting jig according to any one of claim 19, wherein said ferrule set stage is rotatable around a alignment direction of fiber inserting holes of the ferrule set on said ferrule set stage.

* * * * *